United States Patent
Cheng et al.

(10) Patent No.: US 9,930,643 B2
(45) Date of Patent: Mar. 27, 2018

(54) RESOURCE ALLOCATION CONTROL FOR LONG TERM EVOLUTION DEVICE-TO-DEVICE DISCOVERY

(71) Applicant: QUALCOMM Incorporated, San Diego, CA (US)

(72) Inventors: Hong Cheng, Bridgewater, NJ (US); Sudhir Kumar Baghel, Bridgewater, NJ (US)

( * ) Notice: Subject to any disclaimer, the term of this patent is extended or adjusted under 35 U.S.C. 154(b) by 184 days.

(21) Appl. No.: 14/596,146

(22) Filed: Jan. 13, 2015

(65) Prior Publication Data
US 2015/0319737 A1 Nov. 5, 2015

Related U.S. Application Data

(60) Provisional application No. 61/987,839, filed on May 2, 2014.

(51) Int. Cl.
*H04W 72/04* (2009.01)
*H04W 76/02* (2009.01)
*H04W 72/02* (2009.01)

(52) U.S. Cl.
CPC ....... *H04W 72/0406* (2013.01); *H04W 72/04* (2013.01); *H04W 76/023* (2013.01); *H04W 72/02* (2013.01)

(58) Field of Classification Search
None
See application file for complete search history.

(56) References Cited

U.S. PATENT DOCUMENTS

2013/0294283 A1* 11/2013 Van Phan ............... H04W 4/00 370/252
2014/0314049 A1* 10/2014 Cho ........................ H04L 5/006 370/332

(Continued)

FOREIGN PATENT DOCUMENTS

| GB | 2497589 A | 6/2013 |
| GB | 2503508 A | 1/2014 |
| WO | 2012113136 A1 | 8/2012 |

OTHER PUBLICATIONS

ETSI MCC: "Report of 3GPP TSG RAN WG2 meeting #83", 3GPP Draft; R2-133723_REPORT_RAN2_83_Barcelona, 3rd Generation Partnership Project (3GPP), Mobile Competence Centre ; 650, Route Des Lucioles ; F-06921 Sophia-Antipolis Cedex ; France, vol. TSG RAN, No. Ljubljana, Slovenia; Oct. 7, 2013-Oct. 11, 2013 Oct. 11, 2013 (Oct. 11, 2013 ), XP050752808, Retrieved from the Internet: URL:http://www.3gpp.org/ftp/tsg_ran/WG2_RL2/TSGR2_83bis/ Docs/ [retrieved on Oct. 11, 2013].

(Continued)

*Primary Examiner* — Vinncelas Louis
(74) *Attorney, Agent, or Firm* — Arent Fox, LLP and Qualcomm, Incorporated

(57) ABSTRACT

A method, an apparatus, and a computer program product for wireless communication are provided. The apparatus may be a UE. The UE determines whether system information is received for D2D communication. In addition, the UE sets at least one flag based on the system information when the system information is received. Further, the UE determines D2D resources based on the at least one flag.

27 Claims, 17 Drawing Sheets

(56) References Cited

U.S. PATENT DOCUMENTS

| | | | |
|---|---|---|---|
| 2015/0043448 A1* | 2/2015 | Chatterjee | H04W 8/005 370/329 |
| 2015/0264677 A1* | 9/2015 | He | H04W 72/02 370/312 |
| 2015/0271861 A1* | 9/2015 | Li | H04W 76/023 455/426.1 |
| 2016/0234702 A1* | 8/2016 | Heo | H04W 24/04 |
| 2017/0041818 A1* | 2/2017 | Lee | H04W 4/001 |

OTHER PUBLICATIONS

International Search Report and Written Opinion—PCT/US2015/024046—ISA/EPO—Jul. 8, 2015.

\* cited by examiner

RESOURCE ALLOCATION CONTROL FOR LONG TERM EVOLUTION DEVICE-TO-DEVICE DISCOVERY

CROSS-REFERENCE TO RELATED APPLICATION(S)

This application claims the benefit of U.S. Provisional Application Ser. No. 61/987,839, entitled "RESOURCE ALLOCATION CONTROL FOR LONG TERM EVOLUTION DEVICE-TO-DEVICE DISCOVERY" and filed on May 2, 2014, which is expressly incorporated by reference herein in its entirety.

BACKGROUND

Field

The present disclosure relates generally to communication systems, and more particularly, to resource allocation control for long term evolution device-to-device discovery.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be user equipment for wireless communication. The apparatus determines whether system information is received for device-to-device communication. The apparatus sets at least one flag based on the system information. The apparatus determines D2D resources based on the at least one flag.

A first layer of the UE may receive the system information and may set the at least one flag, and a second layer that is higher than the first layer may check the at least one flag and may request the first layer to determine the D2D resources. The first layer may be a radio resource control (RRC) layer, and the second layer may be a proximity-based service (ProSe) protocol layer. The system information may be determined to have been received for D2D communication, and the apparatus may determine whether a set of common D2D resources is indicated in the system information, and may determine a radio resource control (RRC) state of the UE, wherein the at least one flag may be set based on whether the set of the common D2D resources is indicated in the system information, and based on the determined RRC state. The set of common D2D resources may be determined to be indicated in the system information, and the RRC state may be determined to be an RRC idle state, and the apparatus may set the at least one flag by setting a first flag of the at least one flag to indicate for the second layer that a request for an allocation of the D2D resources is unrequired. The apparatus may set the at least one flag by setting a second flag of the at least one flag to indicate that D2D communication is supported. The apparatus may determine from the at least one flag that D2D communication is supported, and that a request for an allocation of the D2D resources is unrequired, and may determine the D2D resources by determining to use the set of common D2D resources indicated in the system information for D2D communication. The set of common D2D resources may be determined to be indicated in the system information, and the RRC state may be determined to be an RRC connected state, and the apparatus may set the at least one flag by setting a first flag of the at least one flag to indicate that a request for an allocation of the D2D resources is required. The apparatus may set the at least one flag by setting a second flag of the at least one flag to indicate that D2D communication is supported. The apparatus may determine from the at least one flag that D2D communication is supported, and that a request for an allocation of the D2D resources is required, and may determine the D2D resources by requesting, at the second layer, the first layer to request an allocation of the D2D resources from a serving base station, and by receiving the allocation of the D2D resources from the serving base station, wherein the determined D2D resources may be the received allocated D2D resources. The apparatus may determine from the at least one flag that D2D communication is supported, and that a request for an allocation of the D2D resources is required, and may determine the D2D resources by requesting, at the second layer, the first layer to request performing the D2D communication with a set of D2D resources from a serving base station, and by receiving a confirmation from the base station that the set of D2D resources is reserved for D2D communication. The set of common D2D resources may be determined to be not indicated in the system information, and the RRC state may be determined to be an RRC idle state, and the apparatus may set the at least one flag by setting a first flag of the at least one flag to indicate for the second layer that a request for an allocation of the D2D resources is required. The apparatus may set the at least one flag by setting a second flag of the at least one flag to indicate that D2D communication is supported. The apparatus may determine from the at least one flag that D2D communication is supported, and that a request for an allocation of the D2D resources is required, and may determine the D2D resources by transitioning from the RRC idle state to an RRC connected state, by requesting, at the second layer, the first layer to request an allocation of the D2D resources from a serving base station, and by receiving the allocation of the D2D resources from the serving base station, wherein the determined D2D resources may be the received allocated D2D resources. The apparatus may control, by the second layer, a third layer that is higher than the first layer to cause the first layer to transition from the RRC idle state to the RRC connected state. The third layer may be a non-access stratum (NAS) layer. The set of common D2D resources may be determined to be not indicated in the system information, and the RRC state may be determined to be an RRC connected state, and the apparatus may set the at least one flag by setting a first flag of the at least one flag to indicate for the second layer that a request for an allocation of the D2D resources is required. The apparatus may set the at least one flag by setting a second flag of the at least one flag to indicate that D2D communication is supported. The apparatus may determine from the at least one flag that D2D communication is supported, and that a request for an allocation of the D2D resources is required, and may determine the D2D resources by requesting, at the second layer, the first layer to request an allocation of the D2D resources from a serving base station, and by receiving the allocation of the D2D resources from the serving base station, wherein the determined D2D resources are the received allocated D2D resources. The apparatus may determine from the at least one flag that D2D communication is supported, and that a request for an allocation of the D2D resources is required, and may determine the D2D resources by requesting, at the second layer, the first layer to request performing the D2D communication with a set of D2D resources from a serving base station, and by receiving a confirmation from the base station that the set of D2D resources is reserved for D2D communication. The system information may be determined to have been received for D2D communication, a set of common D2D resources may be indicated in the system information, and the apparatus may perform D2D communication using the set of common D2D resources, may stop the D2D communication through the set of common D2D resources, and may transition from an RRC idle state to an RRC connected state, wherein the at least one flag may be set upon transitioning from the RRC idle state to the RRC connected state, and wherein the apparatus may set the at least one flag by setting a first flag of the at least one flag to indicate that a request for the allocation of the D2D resources is required. The apparatus may set the at least one flag by setting a second flag of the at least one flag to indicate that D2D communication is supported. The apparatus may determine from the at least one flag that D2D communication is supported, and that a request for an allocation of the D2D resources is required, and may determine the D2D resources by determining, at the second layer, that no D2D resources are available, by requesting, at the second layer, the first layer to request an allocation of the D2D resources from a serving base station, and by receiving the allocation of the D2D resources from the serving base station, wherein the determined D2D resources are the received allocated D2D resources. The system information may be determined to have been received for D2D communication, a set of common D2D resources might not be indicated in the system information, the apparatus may perform D2D communication using an allocated set of D2D resources, may receive a revocation of the use of the allocated set of D2D resources, and may set the at least one flag by setting a first flag of the at least one flag to indicate that a request for the allocation of the D2D resources is required. The apparatus may set the at least one flag by setting a second flag of the at least one flag to indicate that D2D communication is supported. The apparatus may determine from the at least one flag that D2D communication is supported, and that a request for an allocation of the D2D resources is required, and may determine the D2D resources by determining, at the second layer, that no D2D resources are available, by requesting, at the second layer, the first layer to request an allocation of the D2D resources from a serving base station, and by receiving the allocation of the D2D resources from the serving base station, wherein the determined D2D resources are the received allocated D2D resources. The system information may be determined not to have been received for D2D communication, and the apparatus may set the at least one flag by setting a flag of the at least one flag indicating that D2D communication is unsupported, wherein the D2D resources may be determined to be a null set. The apparatus may transmit signals in the D2D resources.

DETAILED DESCRIPTION

Figure 1:
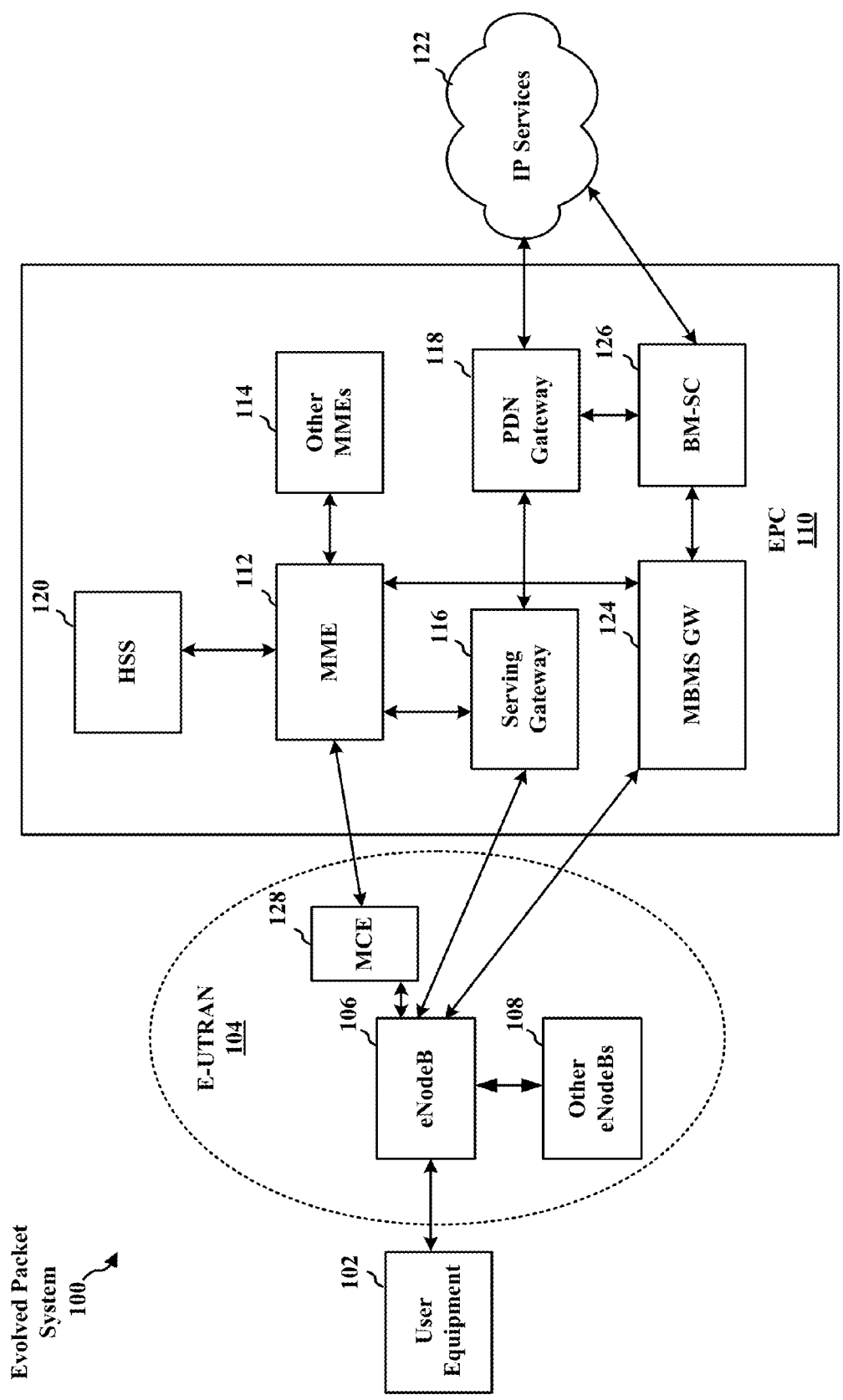
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
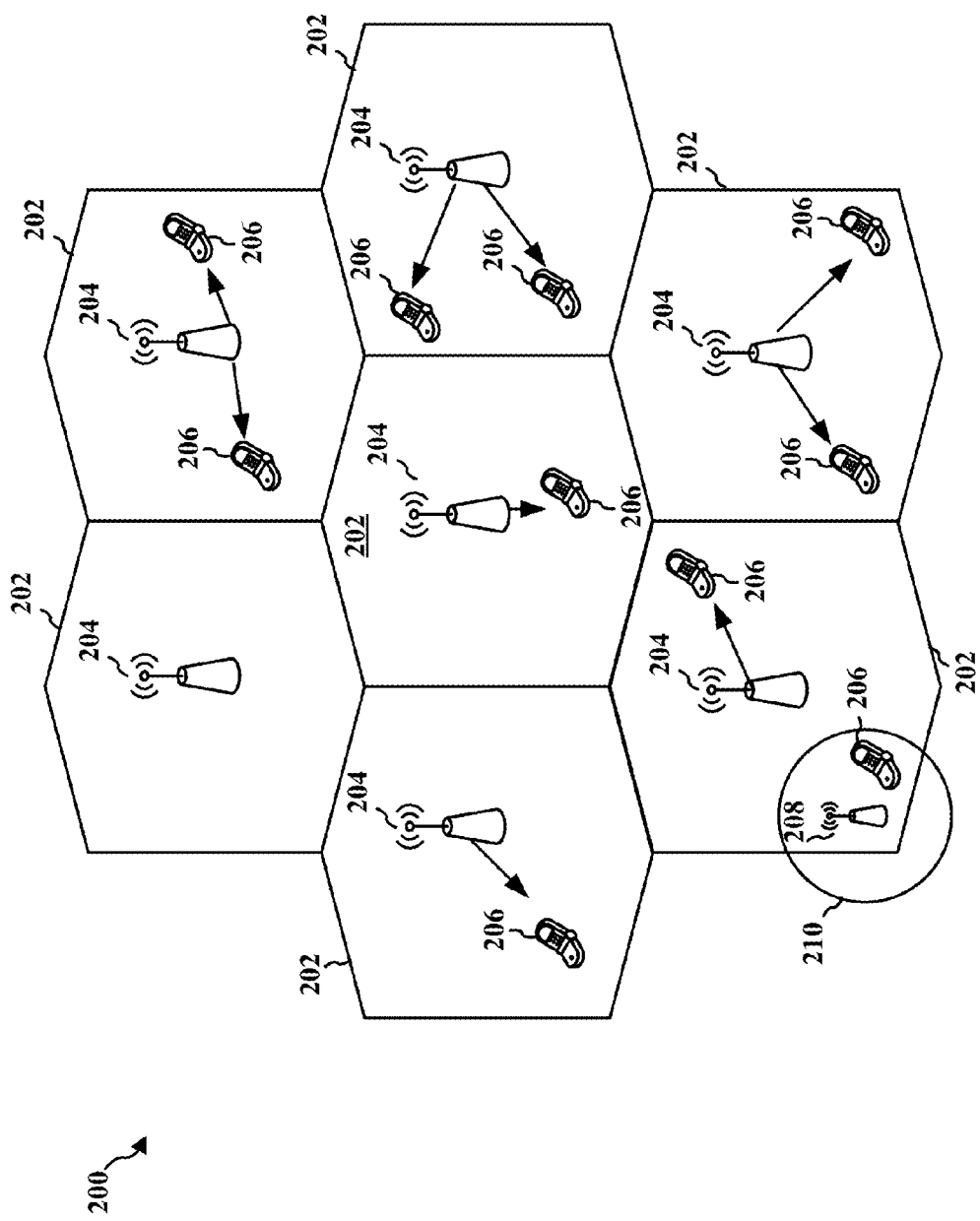
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
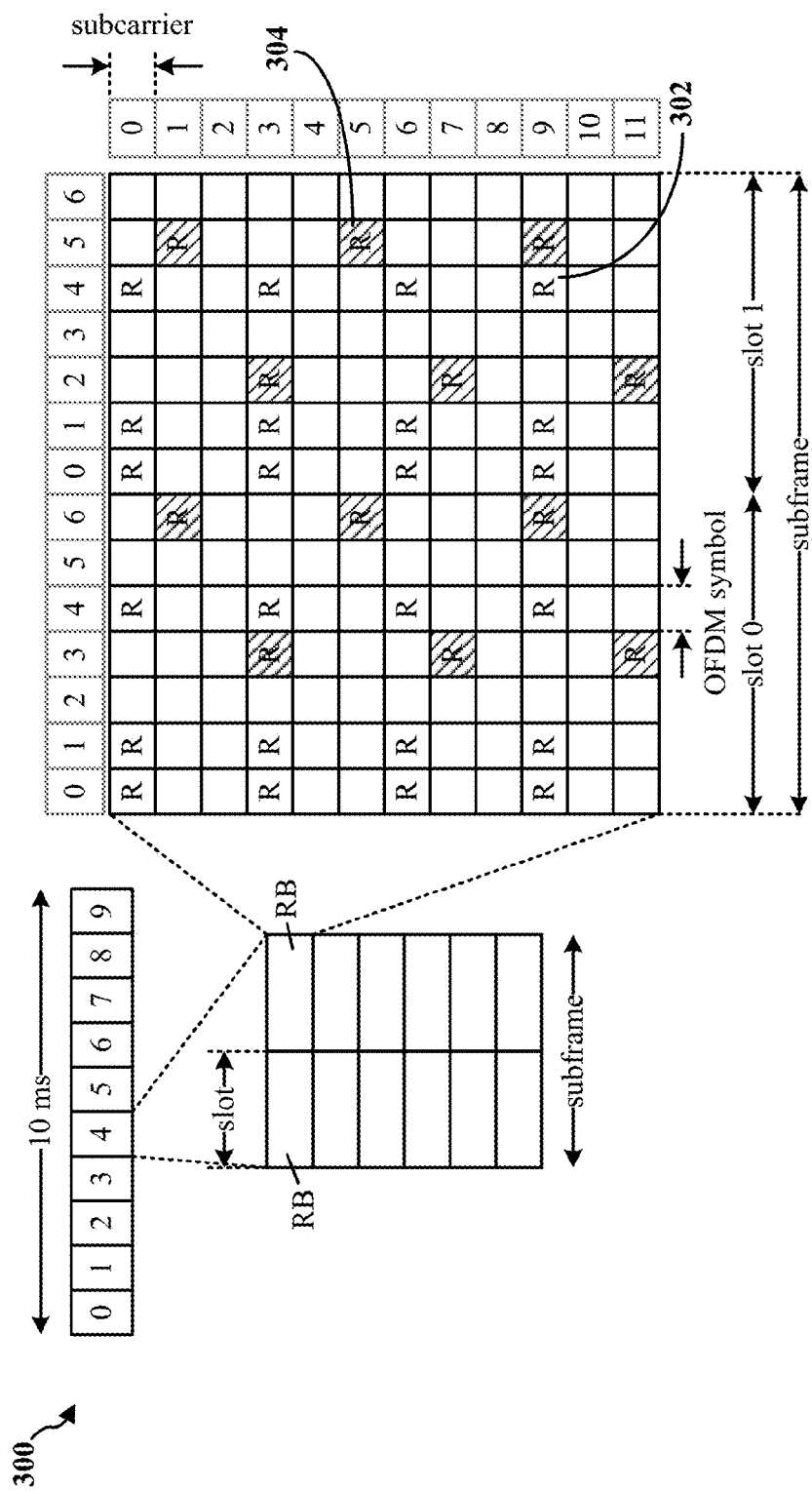
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
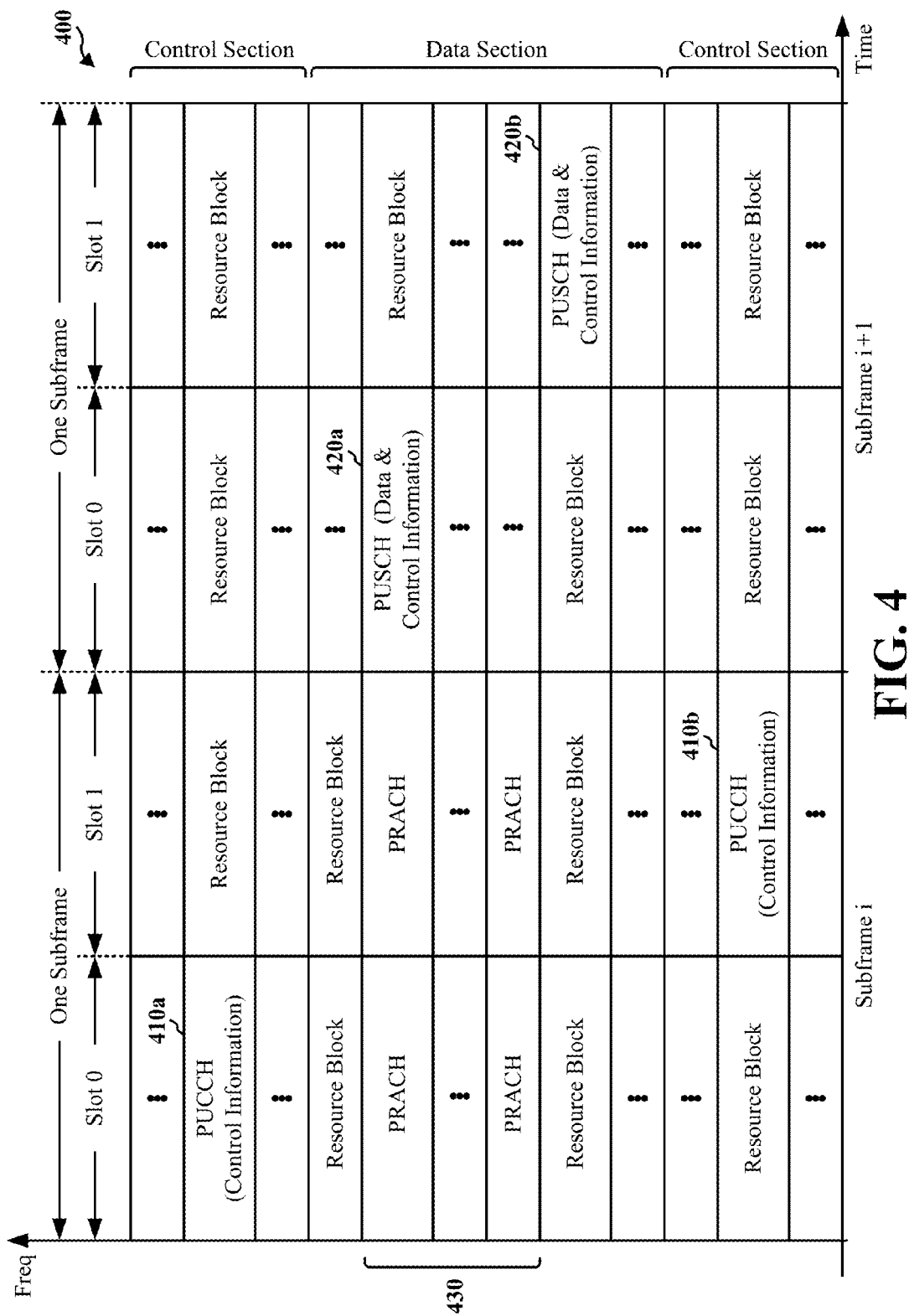
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
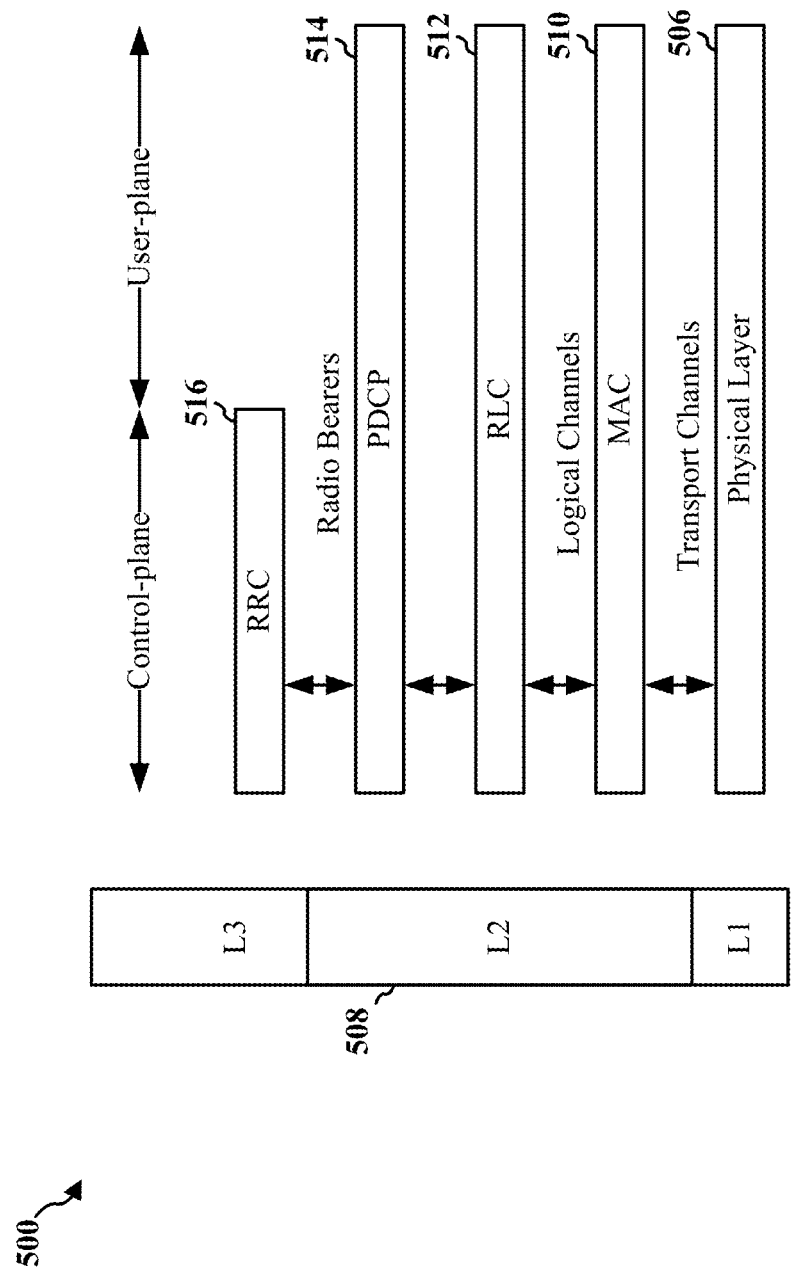
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
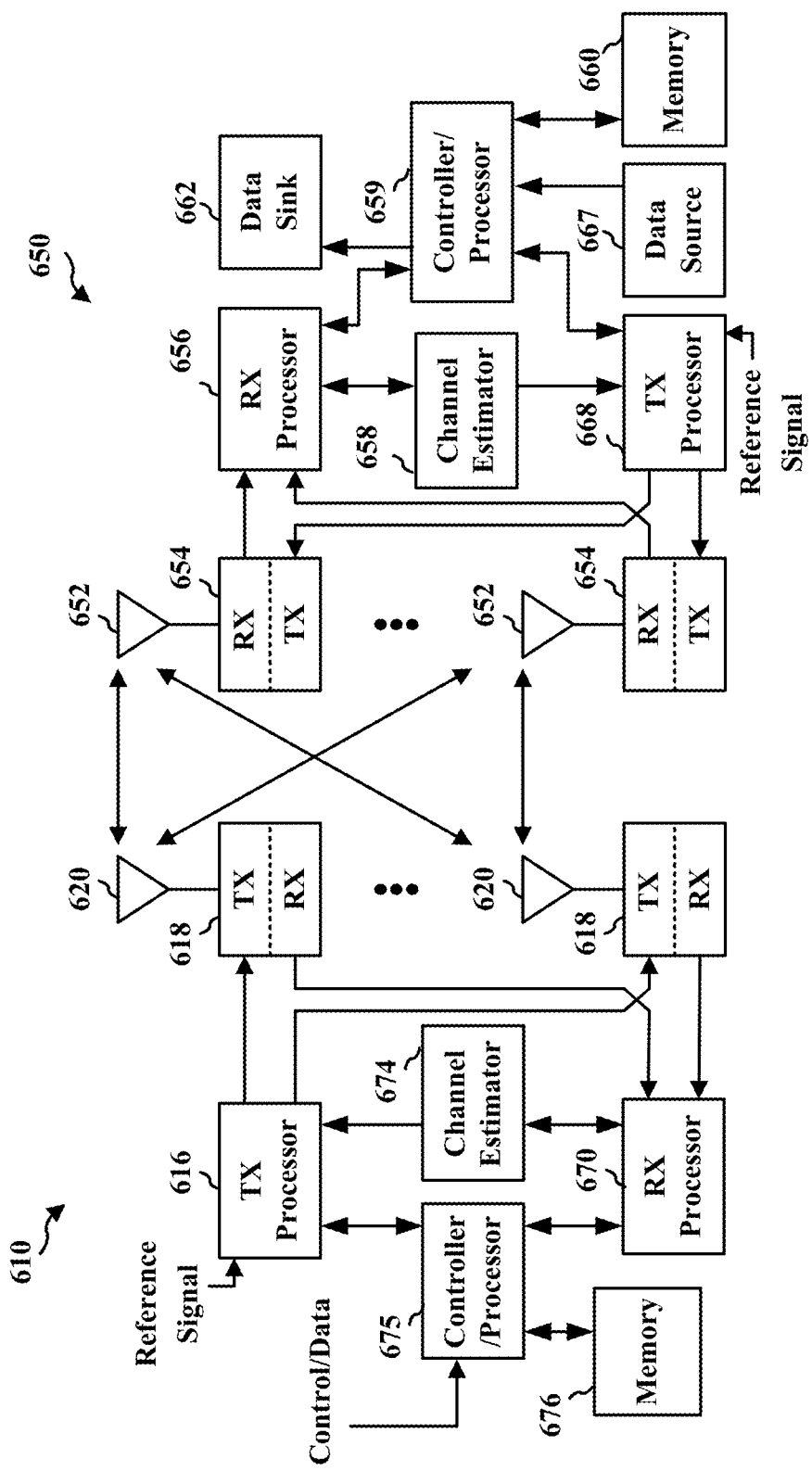
FIG. 6 is a diagram illustrating an example of an evolved Node B (eNB) and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub carrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
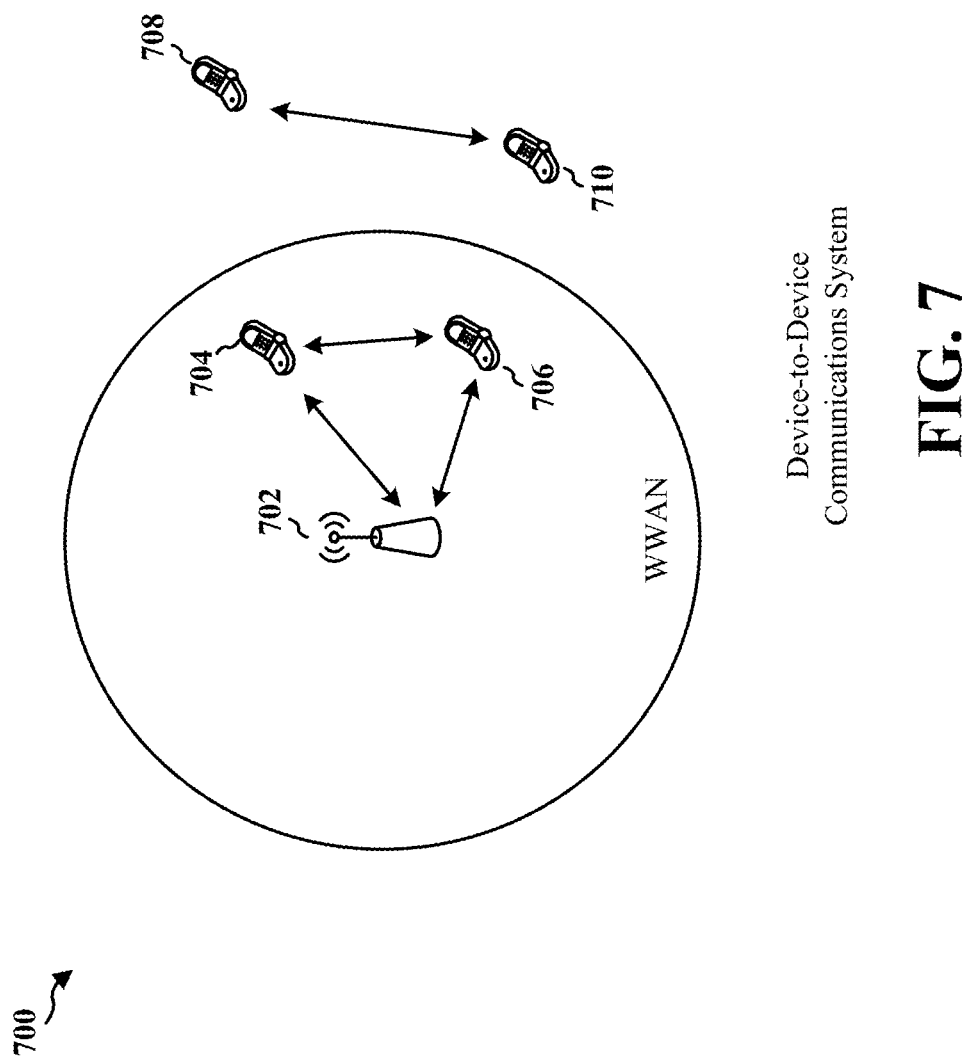
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Exemplary embodiments generally provide methods and apparatuses for allowing a UE to communicate with another UE (for example, allowing the UE to announce something over the LTE band, which is received by the other UE).

Figure 8:
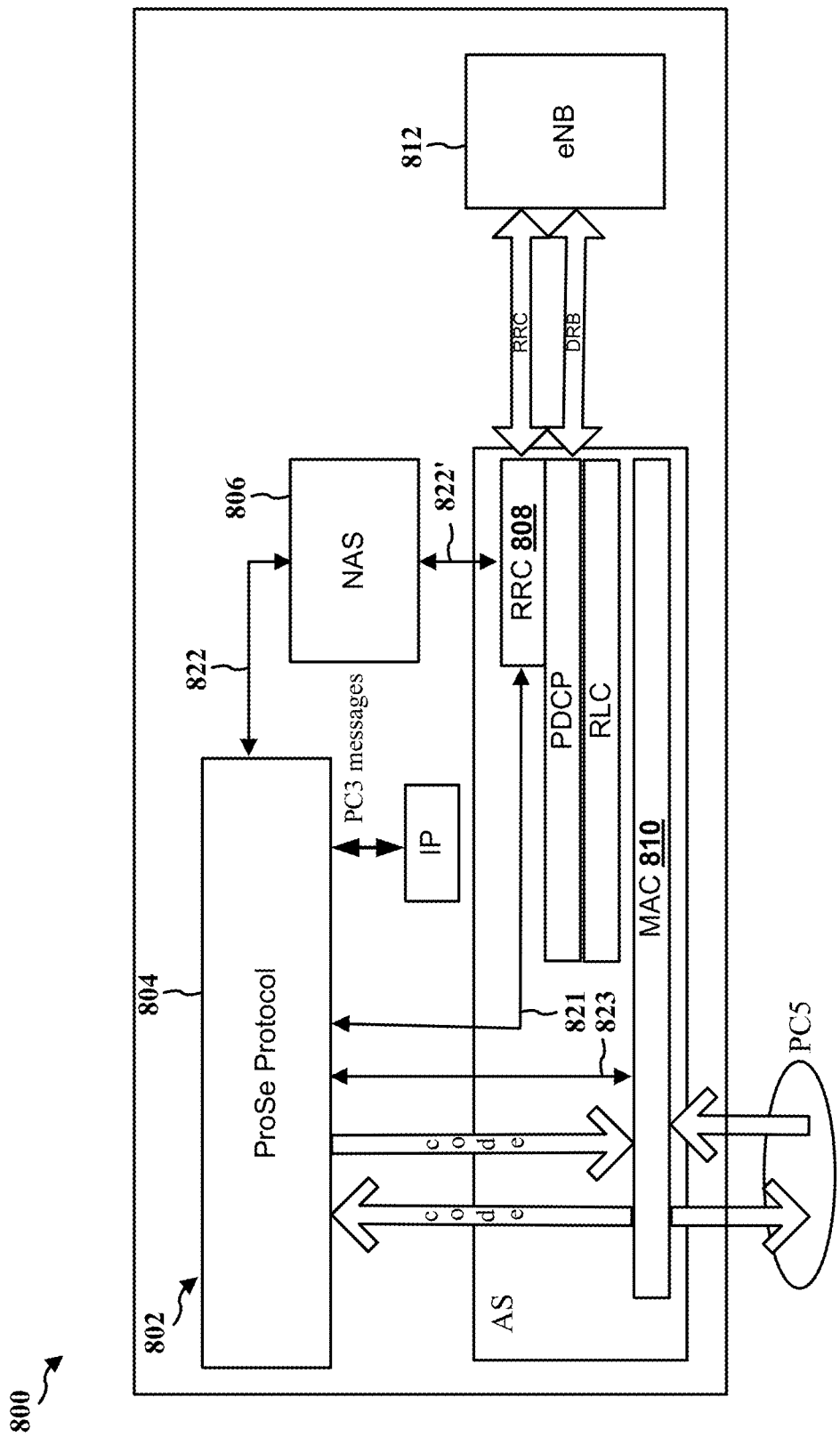
FIG. 8 is a block diagram depicting various layers that make up a stack of a UE involved in device-to-device (D2D) communication, the layers functions, and various interfaces therebetween.

FIG. 8 is a block diagram 800 depicting various layers that make up a stack of a UE 802 involved in D2D communication, such as D2D Discovery communication, their functions, and various interfaces therebetween. The various layers of the stack of the UE 802 include a ProSe (Proximity-based Service) Protocol 804, a Non-Access Stratum (NAS) layer 806, a RRC layer/sublayer 808, and a MAC layer/sublayer 810. Various other layers/sublayers may exist in the stack of the UE 802 of exemplary embodiments. However, the present detailed description will focus on the ProSe Protocol 804, the NAS layer 806, the RRC layer 808, and the MAC layer 810, and various interaction channels between different ones of the layers.

Below the ProSe Protocol 804 is the NAS layer 806, which is able to control the state transition of the UE 802 (e.g., from an "idle state" to a "connected state"). However, the NAS layer 806 is typically unaware of D2D operation. Furthermore, the NAS layer 806 is shared and affected by other applications.

Below the NAS layer 806 is the RRC layer 808, which has information with respect to the requirements for D2D radio resources allocation, and which also has information with respect to the current state of the UE 802, but is unable to control transition of the UE state. The RRC layer 808 is able to control the radio resources of the UE 802, and is able to communicate with a base station/eNB 812 of the network. Accordingly, radio resource allocation is only available to, and controlled by, the RRC layer 808. Furthermore, radio resource allocation may not be immediately known to the NAS layer 806 or to the ProSe Protocol 804.

Finally, below the RRC layer 808 is the MAC layer 810, which is in charge of transmission scheduling for the UE 802. That is, the MAC layer 810 effectively decides when some message to be transmitted by the UE 802 goes over the air, which may be scheduled by communicating with the ProSe Protocol 804. Also, the RRC layer 808 can control MAC Radio Resources of the MAC layer 810 according to system information provided by the network, and according to other events, as will be discussed below.

Embodiments address the fact that information with respect to available D2D resources, and information with respect to a connection state of a generic UE (i.e., connected or idle), are known to only select layers of the stack of said UE. Furthermore, the ability to control, or to transition, said UE from one state to the next (e.g., from the idle state to the connected state) might be possessed by only one or more layers.

For example, a control protocol (e.g., the ProSe Protocol) corresponding to an upper layer of a generic UE is aware of the timing and information constraints corresponding to D2D transmission, but does not have direct access to information corresponding to lower layers (such as the RRC layer).

In exemplary embodiments, under certain circumstances, the ProSe Protocol 804 may exchange information with the NAS layer 806 (e.g., via interface 822), with the RRC layer 808 (e.g., via interface 821), and with the MAC layer 810 (e.g., via interface 823), while the RRC layer 808 may communicate with the NAS layer 806 (e.g., via interface 822'). Additionally, the RRC layer 808 may communicate with the base station/eNB 812.

Radio resources allocation for the UE 802 for D2D communication, such as LTE Direct (LTE-D) Discovery, may be controlled by the network to which the eNB 812 is connected. Before the UE 802 can directly communicate with another UE (with which the UE 802 seeks to engage in D2D Discovery communication), the UE 802 may obtain permission from the network via the eNB 812. Once the UE 802 receives permission from the network, the UE 802 may send the code corresponding to its intended communication over the air to the other UE. By using D2D resources that may be referred to as peer discovery resources the UE 802 is able to be discovered by the other UE, and is thereafter able to directly communicate with the other UE using D2D resources that may be referred to as D2D communication resources. LTE-D Discovery considers three main use cases—1) when system information (e.g., information contained in a System Information Block (SIB)) indicates Type 1 (i.e., common) resources, 2) when the system information indicates only that the network supports LTE-D, and 3) when no system information for D2D is provided. Depending on the use case and a connected/idle state of the UE, the UE may or may not send an RRC message requesting resources (e.g., Type 2 (allocated) resources and/or Type 1 (common) resources). The following are the three main use cases (1, 2, and 3), and their subparts (a, b, and c) for LTE-D Discovery:

Case 1a) When the system information (e.g., the SIB) for D2D communication indicates Type 1 resources (e.g., the system information indicates that a set of D2D resources, such as common peer discovery resources or D2D communication resources, is available via the eNB 812 from a resources pool), and when the UE 802 is in the idle state (e.g., an RRC idle state), then the UE 802 can use the indicated Type 1 resources for D2D Discovery communication, and no RRC message is required. That is, when the UE 802 is in the idle state, the UE 802 can make use of information (e.g., resources information) broadcast by the eNB 812, and is able to perform radio resource management without additional communication with the eNB 812.

Case 1b) When the SIB for D2D communication indicates Type 1 resources, and the UE 802 is in the connected state (e.g., an RRC connected state), then the UE 802 sends an RRC message to the eNB 812 for resources allocation, regardless of whether the UE uses Type 1 or Type 2 resources. That is, when the UE 802 is in the connected state, the UE 802 asks the network, via the eNB 812, for permission, as well as for information regarding the resources allocation, to allow the UE 802 to perform the D2D Discovery communication.

Case 1c) When the SIB for D2D communication indicates Type 1 resources, and the UE 802 transitions from the idle state to the connected state while utilizing the Type 1 resources for peer discovery or for D2D communication, the UE 802 may end transmission using the current Type 1 resources, and may send an RRC message for resources allocation, and may then resume transmission with the allocated resources indicated by the eNB 812.

Case 2a) When the SIB for D2D communication only indicates that the network supports LTE-D (e.g., that the network supports peer discovery, or that discovery is supported), but fails to indicate any Type 1 resources information, and the UE 802 is in the idle state, the UE 802 may transition to the connected state, and may then send an RRC message to request the network for resources.

Case 2b) When the SIB for D2D communication indicates that D2D communication and D2D discovery are supported, but fails to indicate any resources information, and the UE 802 is in the connected state, the UE 802 will send an RRC message for resources allocation.

Case 2c) When the SIB for D2D communication indicates that D2D communication and D2D discovery are supported, but fails to indicate any resources information, and either the UE 802 loses its connection with the network or the eNB 812 revokes the resources granted to the UE 802, the UE 802 may no longer continue to use the resources.

Case 3) When no SIB for D2D is provided (e.g., when the UE 802 is served by a legacy eNB, and is not connected to a network that supports LTE-D), then the UE 802 may not perform D2D transmission, and may cease sending code to the MAC layer 810. That is, when the eNB 812 is connected to a network that does not support D2D discovery or D2D communication, the UE 802 may not engage in D2D communication with the other UE.

Each of the above cases (1a, 1b, 1c, 2a, 2b, 2c, and 3) corresponds to one of FIGS. 9-13, and will be discussed with respect to exemplary embodiments in further detail below.

The exemplary embodiments provide configurations for the UE 802 to perform methods of radio resources allocation for LTE D2D communication or LTE D2D discovery, while still operating within the same schemes, or cases, outlined above. That is, the exemplary embodiments provide methods and apparatuses for managing resource allocation to UEs connected to an LTE-D network under various scenarios.

For example, for the purpose of supporting proper D2D resources management, exemplary embodiments allow the RRC layer 808 to receive a trigger from an upper layer, such as the NAS layer 806 or the ProSe Protocol 804, wherein the trigger causes the RRC layer 808 to send a "D2D Resource Request" message to the eNB 812. This scenario will be discussed with reference to cases 1b, 1c, 2a, and 2b.

Furthermore, exemplary embodiments enable the RRC layer 808 to indicate or communicate some state change events to the ProSe Protocol 804 to thereby enable the ProSe Protocol 804 to decide what actions need to be taken. This scenario will be discussed with reference to cases 2c and 3.

Additionally, exemplary embodiments take into consideration that the sending of an RRC message (e.g., the sending of the D2D Resource Request message by the RRC layer 808) is not always accompanied by a state transition of the UE 802. In such a case, involving the NAS layer 806 may not provide any additional benefit, and may reduce efficiency of operation of the UE 802. This scenario will be discussed with reference to cases 1b and 2b.

Referring back to FIG. 8, exemplary embodiments provide for efficient UE management of resources for LTE D2D communication by providing an interface, or an interaction channel, 821 between the ProSe Protocol 804 and the RRC layer 808 in the UE 802. The interaction channel 821 enables the RRC layer 808 to provide information to the ProSe Protocol 804, which may handle related state transition of the UE 802 based on the information (as well as based upon the connection/idle state of the NAS layer 806).

In the present embodiment, the information provided by the RRC layer 808 to the ProSe Protocol 804 corresponds to: 1) whether the network of the eNB 812 supports LTE-D (D2D); and 2) whether the RRC layer 808 will require some action by the other layers of the UE 802 to enable the RRC layer 808 to obtain the resources from the eNB 812.

For each of the cases described above, the information may be communicated by the RRC layer 808 to the ProSe Protocol 804 using one or more flags, thereby enabling the RRC layer 808 to indicate certain states of the UE 802 while communicating a relatively small amount of information. In the present embodiment, the RRC layer 808 communicates the above information to the ProSe Protocol 804 by setting two flags. For purposes of the present detailed description, these flags may be referred to as a "Trigger Needed" flag, and a "Discovery Supported" flag. These two flags are set by the RRC layer 808 according to the RRC layer's reading of the SIB.

In referring to the figures, three different configurations of the flags will be discussed. First, a Discovery Supported flag is set (e.g., a value corresponding to the flag is equal to 1), and a Trigger Needed flag is unset (e.g., a value corresponding to the flag is equal to 0) (e.g., case 1a). Second, both of the Discovery Supported flag and the Trigger Needed flag are set (e.g., cases 1b, 1c, 2a, 2b, and 2c). Third, the Discovery Supported flag is unset (the Trigger Needed flag may be set or unset) (e.g., case 3). Although the term "Discovery Supported flag" is used throughout the present specification and in the figures, in other configurations, the "Discovery Supported flag" may be a "D2D Communication Supported flag" that indicates that D2D communication is supported by the network.

Based on the flags and the UE 802 connection state, the ProSe Protocol 804 may cause a state transition (e.g., by triggering the NAS layer 806), trigger the RRC layer 808 (e.g., to instruct the RRC layer 808 to send a request for resources), and/or send a command to the MAC layer 810, as will be discussed below.

Figure 9:
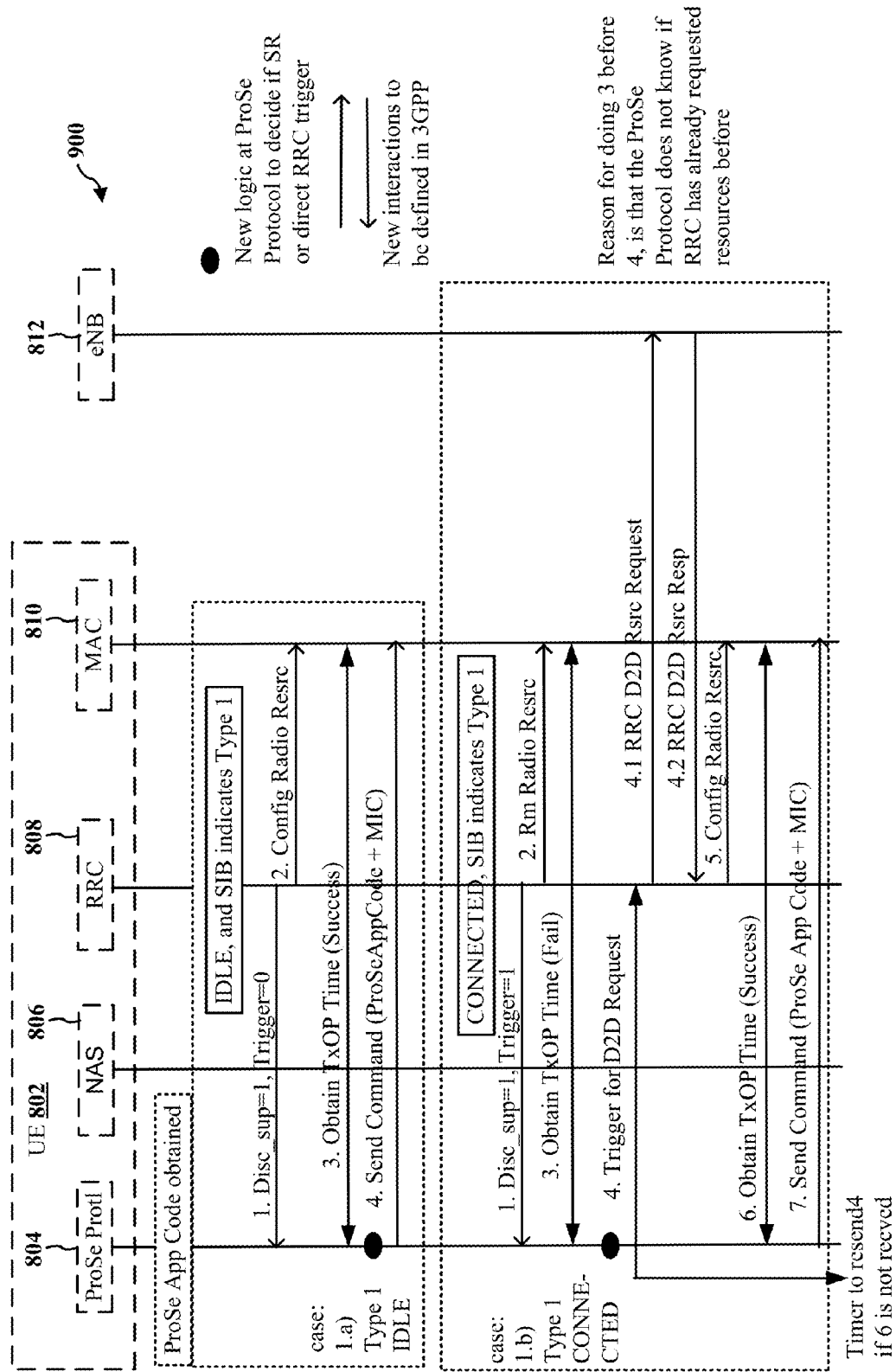
FIG. 9 is a first diagram illustrating exemplary messaging between UE layers and an eNB.

FIG. 9 is a first diagram 900 illustrating exemplary messaging between UE layers and an eNB. Referring to FIG. 9, the abovementioned case 1a is discussed. In the present case, the network of the eNB 812 supports LTE, and the UE 802 is in an idle state. Furthermore, the SIB indicates that Type 1 resources are available, thereby indicating that a common pool of radio resources is available to the UE 802 to select desired resources therefrom for D2D communication (e.g., peer discovery).

Accordingly, the RRC layer 808 sets the Discovery Supported flag (e.g., the Discovery Supported flag is set to 1), while the Trigger Needed flag is unset (e.g., the Trigger Needed flag is set to 0). This information can be seen by the ProSe Protocol 804 in accordance with exemplary embodiments. Furthermore, the flags allow the RRC layer 808 to communicate useful information to the ProSe Protocol 804 without communicating information that does not need to be used by the ProSe Protocol 804 (such as information indicating whether the available resources are Type 1 resources or Type 2 resources).

Furthermore, the MAC Radio Resources for D2D are configured in the MAC layer 810 by the RRC layer 808 in accordance with Type 1 resources, according to the information contained in the SIB. Once, the RRC layer 808 configures the MAC Radio Resources, the ProSe Protocol 804 communicates with the MAC layer 810 via an interface, or interaction channel, 823 (see FIG. 8) to obtain a transmission opportunity (TxOP) time in accordance with one or more ProSe Application Codes (ProSe App Codes) obtained by the ProSe Protocol 804. The interaction channel 823 enables the ProSe Protocol 804 to send a query to the MAC layer 810 so that the ProSe Protocol 804 can know, and the UE 802 can coordinate, when to send out the intended LTE-D message corresponding to the ProSe App Code.

In the present case, because no state transition of the UE 802 is needed for delivery of a message from the UE 802, the ProSe Protocol 804 is able to successfully directly obtain the TxOP from the MAC layer 810 to enable transmission by the UE 802. That is, even though the UE 802 is in an idle state, because the radio resources of the MAC layer 810 are configured, and because the resources are indicated as Type 1 resources, no state transition of the UE 802 is needed for D2D communication or for D2D discovery communication.

Once the ProSe Protocol 804 contacts the MAC layer 810, the MAC layer 810 decides what information to send back to the ProSe Protocol 804 regarding transmission time (e.g., what TxOP time to send back), as the MAC layer 810 needs to assign various times to various intended messages. That is, the ProSe Protocol 804 communicates with the MAC layer 810 to determine a future time that the ProSe Protocol 804 can transmit the ProSe App Code. Accordingly, the MAC layer 810 sends the chosen TxOP time back to the ProSe Protocol 804 so that the MAC layer 810 can relegate a specific time that the ProSe Protocol 804 can deliver a message (e.g., a ProSe App Code and Message Integrity Checksum (MIC)) in accordance with the TxOP time.

It should be noted that, in the present case, although the ProSe Protocol 804 obtains a single TxOP time for a single corresponding ProSe App Code, the UE 802 allows for multiple ProSe App Codes with multiple corresponding respective TxOP times, as will be discussed below.

Upon receiving a valid TxOP time from the MAC layer 810, the ProSe Protocol 804 decides whether to trigger the NAS layer 806 or the RRC layer 808, as will be discussed further below. Because neither trigger is needed in this case, the ProSe Protocol 804 calculates a Message Integrity Checksum (MIC) (e.g., a security integration check result) for each ProSe Application Code based on the corresponding TxOP time. Thereafter, the ProSe Protocol 804 sends the ProSe App Code in accordance with the requested and obtained TxOP time communicated by the MAC layer 810, and the UE 802 sends a D2D communication message (e.g., a D2D Discovery communication message) corresponding to the ProSe App Code.

Continuing to refer to FIG. 9, the abovementioned case 1b is discussed. In the present case, the network of the eNB 812 still supports LTE-D, and the SIB indicates that Type 1 resources are available, but the UE 802 has been transitioned to a connected state.

In the present case, because the RRC layer 808 has been transitioned from the idle state (e.g., in case 1a) to the connected state, the MAC Radio Resources are removed from the MAC layer 810 by the RRC layer 808. That is, the RRC layer 808 sets both of the Discovery Supported flag and the Trigger Needed flag (e.g., the Discovery Supported flag and the Trigger Needed flag are both set to 1), and because the Trigger Needed flag is newly set, the RRC layer 808 removes D2D Radio Resources from the MAC layer 810. Again, the information indicated by the flags can be seen by the ProSe Protocol 804.

Unlike the previous case, when the ProSe Protocol 804 attempts to obtain a TxOP time, in accordance with one or more ProSe App Codes previously obtained by the ProSe Protocol 804, via its communications with the MAC layer 810, the attempt to obtain the TxOP time fails. Because no discovery radio resources have been configured in the MAC layer 810, the MAC layer 810 uses a "NULL TxOP time" to indicate to the ProSe Protocol 804 that some action needs to be taken. That is, the MAC layer 810 sends a "null," or some other indicator, to the ProSe Protocol 804 to indicate that no transmission time is available, thereby indicating to the ProSe Protocol 804 that some action needs to be taken by indicating that no radio resources are available in the discovery period.

Again, the ProSe Protocol 804 decides whether to trigger the NAS layer 806 or the RRC layer 808. Here, because the Discovery Supported flag and the Trigger Needed flag are both set to 1, and because the UE 802 has been transitioned to the connected state, no state transition of the UE 802 is needed. Accordingly, the ProSe Protocol 804 decides to send a trigger to the RRC layer 808.

In greater detail, as a result of failing to obtain a TxOP time, the ProSe Protocol 804 checks the two abovementioned flags set by the RRC layer 808. When the RRC layer 808 indicates that LTE-D is supported, but action is needed (e.g., the Discovery Supported flag and the Trigger Needed flag are both set to 1), the ProSe Protocol 804 checks to determine whether the UE 802 is in the connected state or in the idle state. Because the ProSe Protocol 804 does not need to know what the SIB indicates as available resources (e.g., Type 1 resources or Type 2 resources), that information does not need to be communicated to the ProSe Protocol 804 (e.g., from flags of the RRC layer 808). That is, following a failed attempt to obtain a TxOP time, the ProSe Protocol 804 only needs to know that the Trigger Needed flag is set to 1 to know it should determine the state of the UE 802 (e.g., connected state or idle state). In the present case, because the UE 802 is in the connected state (e.g., the NAS layer 806 of the UE 802 is in the connected state), no state transition is needed, and the ProSe Protocol 804 tells the RRC layer 808 to send a request for resources (e.g., a RRC D2D Rsrc Request) to the eNB 812.

Upon receiving the trigger (e.g., a trigger for D2D Request) from the ProSe Protocol 804, the RRC layer 808 sends the request (e.g., RRC D2D Resource Request) to the eNB 812. Thereafter, the eNB 812 responds to the RRC layer 808 responding to the request by sending a response (e.g., RRC D2D Rsrc Resp) back to the RRC layer 808. Accordingly, by using the described RRC D2D message exchange, the eNB 812 is able to better schedule network traffic (e.g., traffic involving the subject UE 802 and various other UEs using the same eNB 812 to connect to the network).

Then, the RRC layer 808 configures the MAC D2D Radio Resources at the MAC layer 810 in accordance with the information contained in the response received from the eNB 812. That is the MAC D2D Radio Resources for D2D are set according to the information obtained as a result of the message exchange between the RRC layer 808 and the eNB 812. Then, the MAC layer 810 is able to provide the ProSe Protocol 804 with a TxOP time for D2D transmission.

In a manner similar to the previously described case 1a, also shown in FIG. 9, once the ProSe Protocol 804 successfully obtains the TxOP time, the ProSe Protocol 804 calculates a MIC, and thereafter sends a command to the MAC layer 810 corresponding to the subject ProSe App Code and the calculated MIC, and in accordance with the obtained TxOP time. Thereafter, the MAC layer 810 initiates a D2D transmission in accordance with the received command.

Figure 10:
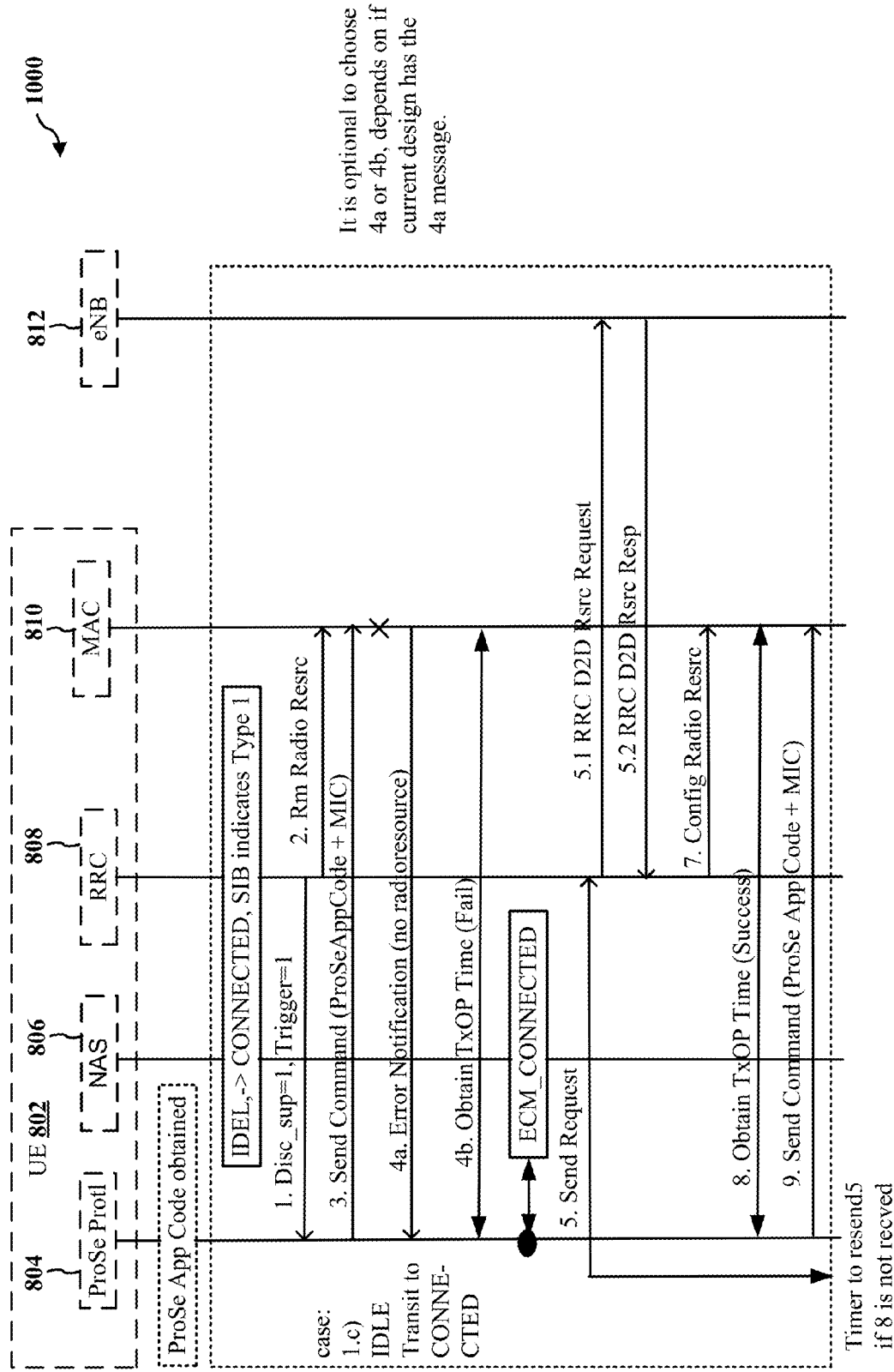
FIG. 10 is a second diagram illustrating exemplary messaging between UE layers and an eNB.

FIG. 10 is a second diagram 1000 illustrating exemplary messaging between UE layers and an eNB. Referring below to FIG. 10, the abovementioned case 1c is discussed. In the present case, the UE 802 transitions from an idle state to a connected state. Again, the network of the eNB 812 supports LTE-D, and the SIB indicates that Type 1 resources are available.

Accordingly, the RRC layer 808 sets the D2D Radio Resources in the MAC layer 810 to NULL. That is, the MAC D2D Radio Resources are removed from the MAC layer 810 by the RRC layer 808, so that it can later set the MAC D2D Radio Resources according to the information contained in the previously described RRC message exchange between the RRC layer 808 and the eNB 812. Furthermore, the RRC layer 808 sets both of the Discovery Supported flag and the Trigger Needed flag, which is information that can be seen by the ProSe Protocol 804.

In the present case, the ProSe Protocol 804 calculates a MIC based upon an obtained ProSe App Code, and sends a command to the MAC layer 810 in accordance with the ProSe App Code and the calculated MIC, as the ProSe Protocol 804 is unaware that the RRC layer 808 has removed the MAC Radio Resources from the MAC layer 810. Unlike case 1a, the command sent by the ProSe Protocol 804 is received in error by the MAC layer 810, as the MAC layer 810 has had its RRC Radio Resources previously removed by the RRC layer 808, and has not been reconfigured.

Accordingly, in the present case, the MAC layer 810 either sends an error notification back to the ProSe Protocol 804 to inform the ProSe Protocol 804 that there are no D2D Radio Resources available to the MAC layer 810, or alternatively, the ProSe Protocol 804 simply fails in its attempt to obtain a TxOP time from the MAC layer 810 (e.g., if a design choice removes the ability for the MAC layer 810 to send an error notification to the ProSe Protocol 804).

Upon receiving the error notification from the MAC layer 810 (or upon failing to obtain a TxOP time), the ProSe Protocol 804 determines whether the UE 802 is in the connected state or the idle state, so that the ProSe Protocol 804 can decide whether to send a trigger to the RRC layer 808 (e.g., FIG. 9, case 1b), or whether to initiate a state transition of the UE 802 from an idle state to a connected state (e.g., case 2a, described further below with respect to FIG. 11).

In the present case, the ProSe Protocol 804 recognizes that the UE 802 is in the idle state by communicating with the NAS layer 806. Because the NAS layer 806 of the UE is in the idle state, the ProSe Protocol 804 attempts to trigger state transition of the UE 802 using what is referred to as "legacy message," or "service request." By using the legacy message/service request, the ProSe Protocol 804 communicates with the NAS layer 806, and the NAS layer 806 transitions the UE 802 to the connected state (ECM_CONNECTED), and indicates to the ProSe Protocol 804 that the state transition has occurred.

Thereafter, and in a manner similar to case 1b, which is shown in FIG. 9, the ProSe Protocol 804 sends a trigger for D2D Request to the RRC layer 808, thereby instructing the RRC layer 808 to retrieve resources from the network via the eNB 812. Upon receiving the trigger, the RRC layer 808 sends the request message (e.g., RRC D2D Resource Request message) to the eNB 812, and the eNB 812 responds by sending a response message (e.g., RRC D2D Resource Response message) to the RRC layer 808. Then, the RRC layer 808 configures the MAC D2D Radio Resources at the MAC layer 810 in accordance with the information contained in the response received from the eNB 812, thereby enabling the ProSe Protocol 804 to successfully obtain a TxOP time from the MAC layer 810. Once the ProSe Protocol 804 successfully obtains the TxOP Time, the ProSe Protocol 804 calculates a MIC, and thereafter sends a command to the MAC layer 810 corresponding to the subject ProSe App Code and MIC, and in accordance with the obtained TxOP Time. Thereafter, the MAC layer 810 initiates a transmission in accordance with the received command.

Figure 11:
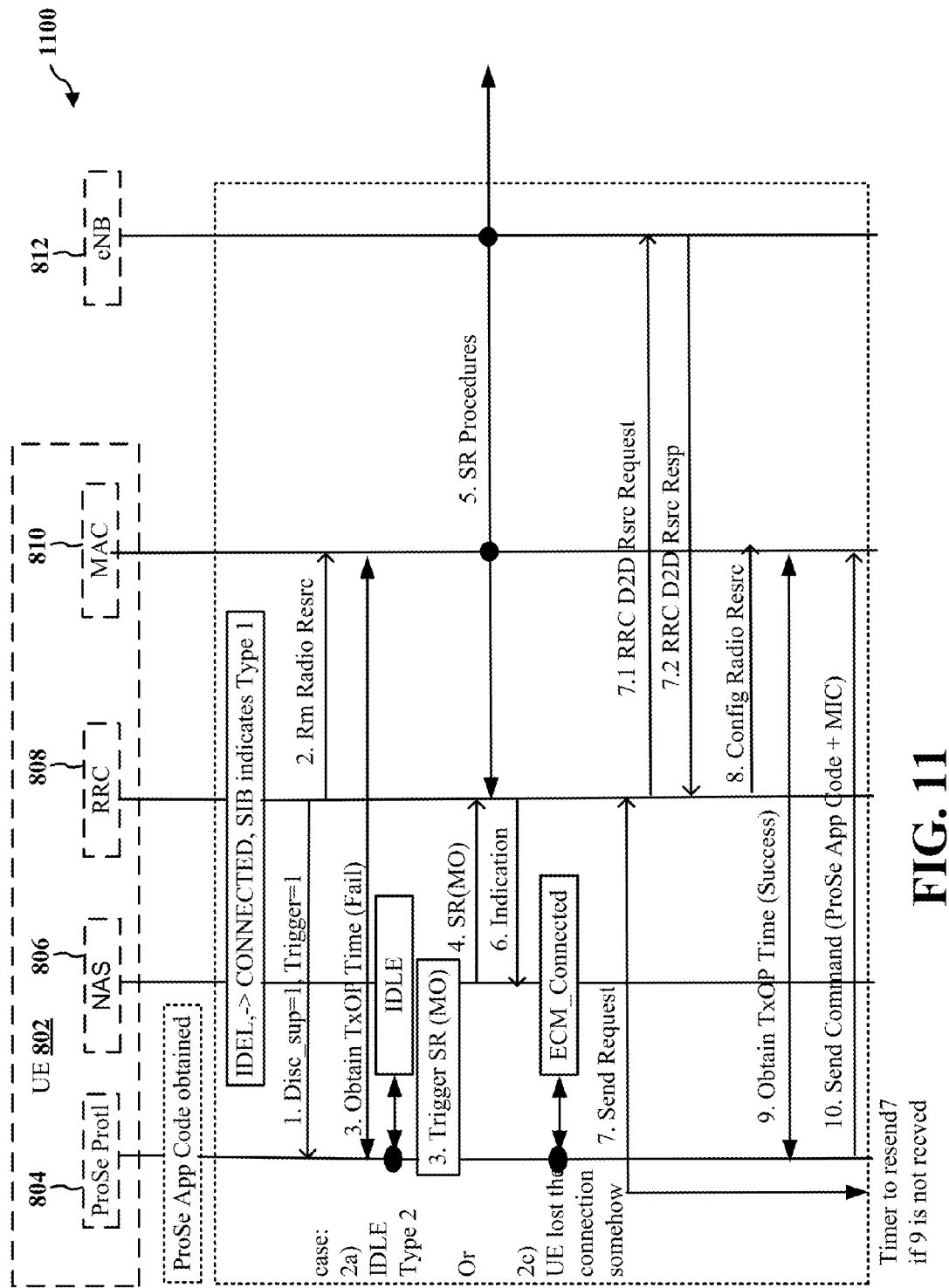
FIG. 11 is a third diagram illustrating exemplary messaging between UE layers and an eNB.

FIG. 11 is a third diagram 1100 illustrating exemplary messaging between UE layers and an eNB. Referring to FIG. 11, the abovementioned case 2a is discussed. In the present case, the UE 802 is an idle state. Unlike the previously described scenarios according to exemplary embodiments, the SIB does not indicate that Type 1 resources are available, but instead merely indicates that D2D communication is supported by the network (e.g., the network supports LTE-D).

Accordingly, because the SIB provides no information with respect to the specific type of resources available (e.g., whether Type 1 or Type 2), the MAC D2D Radio Resources are removed from the MAC layer 810 by the RRC layer 808, and the RRC layer 808 sets both of the Discovery Supported flag (e.g., the D2D Communications Supported flag) and the Trigger Needed flag, which is information that is seen by the ProSe Protocol 804. Because both of the flags are set, and because the UE 802 is in an idle state, the UE 802 will transition states to become in a connected state.

Again, the ProSe Protocol 804 calculates a MIC based upon an obtained ProSe App Code, and sends a command to the MAC layer 810 in accordance with the ProSe App Code and calculated MIC. However, the ProSe Protocol 804 fails in its attempt to obtain a TxOP time from the MAC layer 810, as the MAC layer 810 has had its D2D Radio Resources previously removed by the RRC layer 808. Upon failing to obtain a TxOP time, the ProSe Protocol 804 communicates with the NAS layer 806 which indicates to the ProSe Protocol 804 that the UE 802 is in an idle state.

Because the UE 802 is in an idle state, the ProSe Protocol 804 sends a trigger to the NAS layer 806 to have the NAS layer 806 send a service request (SR) (e.g., a service request with type originating calls) to the RRC layer 808 (e.g., via interaction channel 822' shown in FIG. 8). Then, the NAS layer 806 sends the service request to the RRC layer 808, and the RRC layer 808 communicates with the MAC layer 810, and also communicates with the network via the eNB 812 in accordance with the procedures corresponding to the service request.

Thereafter, once the UE 802 is in a connected state, and the NAS layer 806 receives an indication that the UE 802 is connected, the NAS layer 806 communicates to the ProSe Protocol 804 (e.g., via interaction channel 822 shown in FIG. 8) that the UE is in a connected state (ECM_CONNECTED). It should be noted that the above interaction between the ProSe Protocol 804 and the NAS layer 806 can occur when the UE 802 loses its connection after being in a connected state (e.g., case 2c in FIG. 11).

Thereafter, and in a manner similar with the scenarios discussed with respect to FIGS. 9 and 10 (e.g., cases 1b and 1c), the ProSe Protocol 804 sends a trigger for D2D Request to the RRC layer 808, causing the RRC layer 808 to send the request to the eNB 812, which thereafter responds to request by sending back a response. Then, the RRC layer 808 configures the MAC D2D Radio Resources at the MAC layer 810 in accordance with the information contained in the response, and the ProSe Protocol 804 successfully obtains a TxOP time from the MAC layer 810.

In the present case, the ProSe Protocol 804 polls the MAC layer 810 on the TxOP time to allow the ProSe Protocol 804 to understand when it can send the over the air ProSe Code. Once the ProSe Protocol 804 successfully obtains the TxOP Time, the ProSe Protocol 804 calculates a MIC, and sends a command to the MAC layer 810 corresponding to the subject ProSe App Code and MIC, and in accordance with the obtained TxOP Time. Thereafter, the MAC layer 810 initiates a transmission in accordance with the received command.

Figure 12:
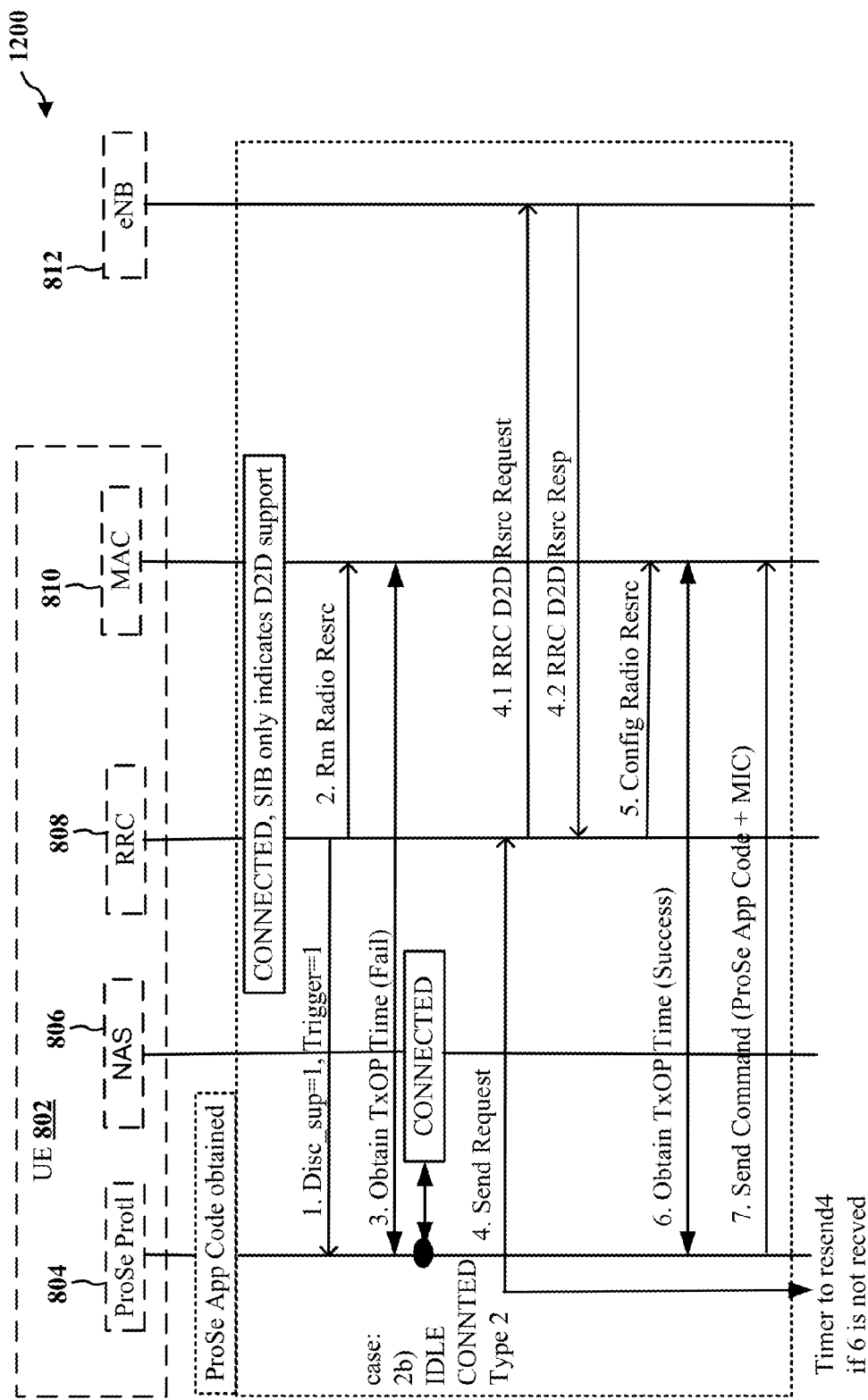
FIG. 12 is a fourth diagram illustrating exemplary messaging between UE layers and an eNB.

FIG. 12 is a fourth diagram 1200 illustrating exemplary messaging between UE layers and an eNB. Referring to FIG. 12, the abovementioned case 2b is discussed. In a manner similar to that shown in FIG. 11 (e.g., case 2a), the SIB does not indicate that Type 1 resources are available, but instead merely indicates that D2D communication is supported by the network (e.g., the network supports LTE-D). However, unlike the scenario discussed with respect to case 2a, the UE 802 is in a connected state. Accordingly, no state transition of the UE 802 will be needed for the intended D2D communication.

Again, the MAC Radio Resources are removed from the MAC layer 810 by the RRC layer 808, and the RRC layer 808 sets both of the Discovery Supported flag and the Trigger Needed flag, which is information that is seen by the ProSe Protocol 804.

Again, the ProSe Protocol 804 calculates a MIC based upon an obtained ProSe App Code, sends a command to the MAC layer 810 in accordance with the ProSe App Code and calculated MIC, and fails in its attempt to obtain a TxOP time from the MAC layer 810. Upon failing to obtain a TxOP time, the ProSe Protocol 804 checks the flags set by the RRC layer 808. Because the Trigger Needed flag is set to 1, the ProSe Protocol 804 determines whether the UE 802 is in the connected state or the idle state. The ProSe Protocol 804 determines the state of the UE 802 by communicating with the NAS layer 806, which indicates that the UE 802 is in a connected state in the present scenario.

Because the UE 802 is in a connected state, and unlike the scenario described with respect to case 2a, the ProSe Protocol 804 does not need to send a trigger to the NAS layer 806 to transition the UE 802 from an idle state to the connected state. Accordingly, and in a manner similar to the scenarios discussed with respect to FIGS. 9, 10, and 11 (cases 1b, 1c, and 2a), the ProSe Protocol 804 sends a trigger for D2D Resource Request to the RRC layer 808, the RRC layer 808 engages in a message exchange (e.g., an RRC D2D Resource Request message exchange) with the eNB 812. Then, the RRC layer 808 configures the MAC D2D Radio Resources at the MAC layer 810 according to information obtained from the eNB 812 via the D2D Resource Request message exchange, and the ProSe Protocol 804 successfully obtains a TxOP time from the MAC layer 810. Then, the ProSe Protocol 804 sends a command to the MAC layer 810 corresponding to the subject ProSe App Code and the calculated MIC, and in accordance with the obtained TxOP Time, thereby enabling the MAC layer 810 to initiate a transmission in accordance with the received command.

Figure 13:
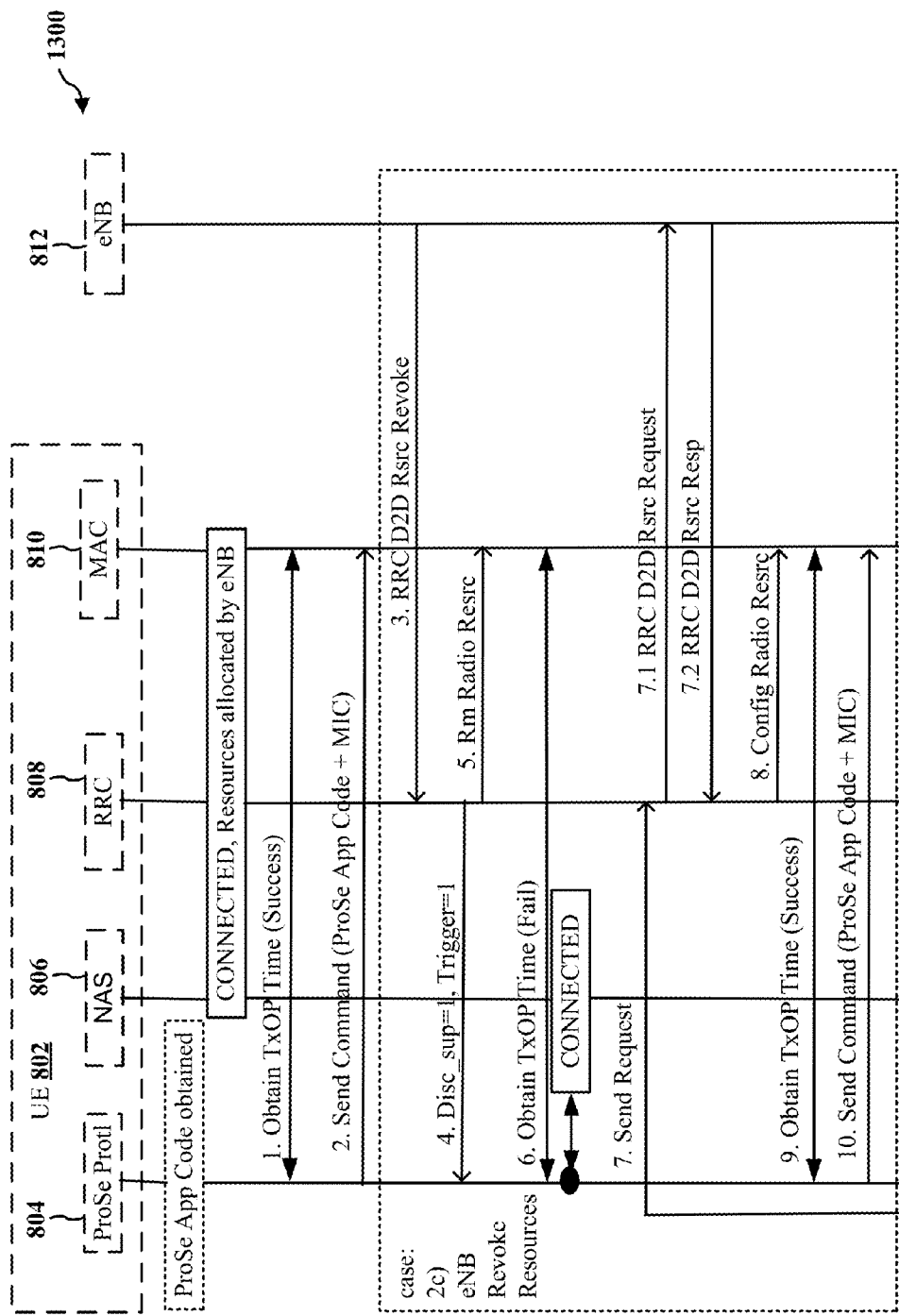
FIG. 13 is a fifth diagram illustrating exemplary messaging between UE layers and an eNB.

FIG. 13 is a fifth diagram 1300 illustrating exemplary messaging between UE layers and an eNB. Referring to FIGS. 11 and 13, the abovementioned case 2c is discussed. Unlike the previously described embodiments, the system information/SIB indicates that the D2D Resources are allocated by the eNB 812. That is, instead of having a Type 1 Resources pool for the UE 802 to choose its resources, Type 2 Resources are assigned, or allocated, to the UE 802 as determined by the network to which the eNB 812 is connected. That is, Type 2 indicates that the network tells the UE 802 specifically which resources to use, and provides the UE 802 with dedicated resources, as opposed to the UE 802 selecting the resources from a pool of resources (e.g., Type 1). Furthermore, the UE 802 is in a connected state.

Accordingly, and in the present case, the ProSe Protocol 804 successfully obtains a TxOP time from the MAC layer 810, and the ProSe Protocol 804 sends a command to the MAC layer 810 corresponding to the subject ProSe App Code and the calculated MIC, and in accordance with the obtained TxOP Time, thereby enabling the MAC layer 810 to initiate a transmission in accordance with the received command. However, in the present scenario, before the MAC layer 810 successfully completes the intended D2D communication, the eNB 812 sends a RRC D2D Resources Revoked message to the RRC layer 808, as shown in FIG. 13 (although the following description will also apply when the UE 802 somehow otherwise loses connection, as shown in FIG. 11).

Thereafter, the RRC layer 808 indicates to the ProSe Protocol 804 that both of the Discovery Supported flag and the Trigger Needed flag are set, and the RRC layer 808 removes the MAC D2D Radio Resources from the MAC layer 810. Accordingly, when the ProSe Protocol 804 sends a command to the MAC layer 810 in accordance with the ProSe App Code and calculated MIC, the ProSe Protocol 804 fails in its attempt to obtain a TxOP time from the MAC layer 810. Thereafter, the ProSe Protocol 804 communicates with the NAS layer 806, which indicates that the UE 802 is still in a connected state, and therefore no state transition is needed, and the ProSe Protocol 804 does not need to send a trigger for a service request SR to the NAS layer 806 (as was the case in the scenario described with respect to case 2a).

Again, and in a manner similar to the scenarios discussed with respect to FIGS. 9, 10, 11, and 12 (cases 1b, 1c, 2a, and 2b), because the NAS layer 806 indicates that the UE 802 is in a connected state, the ProSe Protocol 804 sends a trigger for D2D Request to the RRC layer 808, the RRC layer 808 engages in an RRC D2D Resource message exchange with the eNB 812, and configures the MAC D2D Radio Resources at the MAC layer 810 according to the D2D Resource message exchange. Then, the ProSe Protocol 804 successfully obtains a TxOP time from the MAC layer 810, sends a command to the MAC layer 810 corresponding to the subject ProSe App Code and the calculated MIC in accordance with the obtained TxOP Time, thereby enabling the MAC layer 810 to initiate a transmission in accordance with the received command.

According to other cases that may be experienced by exemplary embodiments, when an error occurs either in the RRC layer's 808 receiving a response to its RRC D2D Resource Request from the eNB 812, or in the RRC layer's 808 configuring of the MAC D2D Radio Resources, the ProSe Protocol 804 will resend the trigger for D2D Request to the RRC layer 808 after a timeout has occurred. That is, after a set amount of time has passed following the initial sending of the trigger to the RRC layer 808 from the ProSe Protocol 804, when the ProSe Protocol 804 receives no communication from the MAC layer 810, the ProSe Protocol 804 resends the D2D Request to the RRC layer 808 to reinitiate a portion of the process described above.

Finally, in an alternative case (e.g., case 3, not shown), the RRC layer 808 may indicate to the ProSe Protocol 804 that the Discovery Supported flag is not set (e.g., that the network connected to the serving base station/eNB 812 does not support peer discovery). In such a scenario, the ProSe Protocol 804 should not attempt D2D operations.

Also considered as potential cases by exemplary embodiments are situations wherein the ProSe Protocol 804 seeks to deliver multiple ProSe App Codes. The ProSe Protocol 804 may have multiple ProSe Application Codes to be announced over the air. When the ProSe Protocol 804 has multiple ProSe Application Codes to send, the ProSe Protocol 804 requests and obtains multiple TxOP times from the MAC layer 810 via the interaction channel 823. Because the resources for the D2D transmission are distributed in both frequency and time domains, it is possible that the resources for the multiple TxOP opportunities correspond to different absolute time values. For example, when the ProSe Protocol 804 requests two transmission opportunities, the MAC layer 810 may return a time t and a time t+1 second. These times may be based on selection from Type 1 resources pool, or based on an allocation of resources as determined by the eNB 812.

Accordingly, in the present scenario, the ProSe Protocol 804 calculates an individual MIC for each of the ProSe Application Codes based on the different times. For example, a first MIC for ProSe App Code 1 is calculated with the time t, and a second MIC for ProSe App Code 2 is calculated with the time t+1.

Accordingly, to ensure that the transmission times t and t+1 for the different messages match their respective MIC, which thereby ensures that a receiving UE (to which the UE 802 seeks to deliver the messages) can correctly validate the messages, when the ProSe Protocol 804 sends the ProSe App Code and MIC to the MAC layer 810 for transmission, the ProSe Protocol 804 informs the MAC layer 810 which ProSe App Code should be transmitted at which time. The exemplary embodiments provide two approaches to indicate the transmission opportunity between the MAC layer 810 and the ProSe Protocol 804. That is, below are provided two possible approaches to indicate the transmission opportunity TxOP times between the MAC layer 810 and the ProSe Protocol 804.

In the first approach, a system of indexing uses separate index numbers assigned to respective TxOP times to distinguish the different TxOP times. For example, when the ProSe Protocol 804 requests multiple TxOP, the MAC layer 810 will index each of these TxOP times with an index number.

When the ProSe Protocol 804 sends down (e.g., through the lower layers) one of the ProSe App Codes and the corresponding MIC towards MAC layer 810, the ProSe Protocol 804 may indicate the index number corresponding to the particular TxOP time used for the calculation of the particular MIC. In the present embodiment, the MAC layer 810 provides the TxOP times in a sequence, and the ProSe Protocol 804 may send the various ProSe Protocol Codes and corresponding MICs according to the same sequence as the time used for the respective MIC calculations. When the MAC layer 810 responds to the ProSe Protocol 804, the MAC layer 810 includes a corresponding time value for each of the TxOP times provided, even though some of the time values may be identical.

In a second, alternative approach, the ProSe Protocol 804 sends the ProSe App Code and MIC together with the TxOP time used for the MIC calculation when the ProSe Protocol 804 transmits the ProSe App Code. Accordingly, the ProSe Protocol 804 may send a TxOP request to request multiple TxOP opportunities, one for each of the ProSe App Codes. Then, the ProSe Protocol 804 indicates in the TxOP request sent to the MAC layer 810 the number of ProSe App Codes to be transmitted. The MAC layer 810 may respond with a list of the TxOP times in accordance with the request received from the ProSe Protocol 804. The MAC layer 810 of the present embodiment may respond with an individual index number for each TxOP time, or may send in a sequence that implies the index for all of the TxOP times, in which case the MAC layer 810 remembers the mapping between the various index numbers and their corresponding TxOP time. However, the ProSe Protocol 804 may include the TxOP time when sending the command for ProSe App Code transmission, thereby obviating any need for the MAC layer 810 to remember index number mapping.

Furthermore, in an alternative operation, the ProSe Protocol 804 may use multiple requests when it has multiple codes to send, instead of sending a single TxOP request indicating multiple TxOP times are requested. In such an alternative operation, the ProSe Protocol 804 would indicate in the request whether it is for the TxOP a new code, or whether the ProSe Protocol 804 is requesting for a new TxOP for an existing/previous ProSe Application Code. For example, ProSe Protocol 804 can index the ProSe App Code with an index number, and include it in the request. This way, the MAC layer knows whether the request is for a new ProSe App Code, although the MAC layer may to remember the mapping of the index and the corresponding TxOP resources allocated to it.

The RRC layer 808 may encounter a situation where the available radio resources have changed. For example, in the case of Type 2 resources allocation (e.g., FIG. 13, case 2c), the eNB 812 may decide to add or reduce the resources allocated to the UE 802 based on the eNB's 812 load, or based on the number of UEs requesting for the D2D transmission. When the available radio resources have changed, the RRC layer 808 may inform the ProSe Protocol 804 to take corresponding action.

For example, the RRC layer 808 may send an indication (that the available radio resources have changed) toward the ProSe Protocol 804 with a system level indicator (e.g., a "Resource Updated" indicator). This will trigger the ProSe Protocol 804 to either request more TxOP times from the MAC layer 810, or send the trigger to RRC layer 808 for resources allocation, along with another indication of the extent of the resources are required. The RRC layer 808 can respond with the actual resources allocated by the network.

In an alternative embodiment, when the RRC layer 808 encounters a situation where the available radio resources have changed, the RRC layer 808 may just configure the MAC layer 810 with the updated resources. Accordingly, when the ProSe Protocol 804 requests the TxOP time at the next opportunity by communicating with the MAC layer 810, the ProSe Protocol will notice the change in network resources (e.g., the ProSe Protocol may see only two TxOP values although it requested three from the MAC layer 810). In this case, the ProSe Protocol 804 would decide the corresponding operation (e.g. suspending the transmission of one or more of the ProSe App Codes according to a set of priorities, or alternate the transmission of the three codes with the two possible TxOP opportunities).

It should be noted that, although the above description of the described cases focused on the UE 802 as a transmitter UE 802 (e.g., an Announcing UE in the LTE-D), the above description can be also applicable to a receiving UE (e.g., the other UE, or a Monitoring UE). In this case, the Monitoring UE is in a connected state, or when the network indicates no resources in the SIB, the RRC layer 808 may set the Trigger Needed flag (e.g., set the value to 1). When the ProSe Protocol 804 decides that it desires to receive the ProSe App Code, it will trigger the RRC layer 808 to send the RRC D2D Resource Request message towards the eNB 812. When the eNB 812 responds with the corresponding confirmation, the RRC layer 808 may set the MAC layer 810 accordingly to receive at the D2D resources.

In the present case, the RRC D2D Resource Request is no longer for D2D transmission resources, but is instead used to indicate to eNB 812 that the UE would perform D2D operation at the receiving resources, such that the eNB 812 should avoid scheduling any normal LTE communication over those resources, thereby potentially avoiding adverse impact to the UE's other applications. Therefore, the D2D Resource Response message sent to the RRC layer 808 back from the eNB 812 does not have to include the resources information, but may instead merely include a confirmation.

In another alternative case, the Announcing UE can be a Monitoring UE as well, wherein the same operation applies. In such a case, the RRC D2D Resource Request message sent to the eNB 812 would indicate whether the message corresponds for transmission resources, for receiving scheduling assistance, or for both. The RRC D2D Resource Response message sent back from the eNB 812 would include transmission resources when the message corresponds to transmission resources, or to both transmission resources and receiving scheduling assistance.

In another alternative case, the Monitoring UE may indicate to the RRC layer 808 that it only desires to receive for a specific public land mobile network (PLMN) or a specific country code. In that case, the RRC layer 808 may translate that request, and may indicate that desire in the corresponding RRC D2D Resources Request. In the RRC D2D Resources Response, the eNB 812 may instruct the UE 802 to operate in a certain manner to carry out the monitoring action (e.g., may instruct the UE 802 to leave gap for the re-tuning of frequency at certain time).

Figure 14:
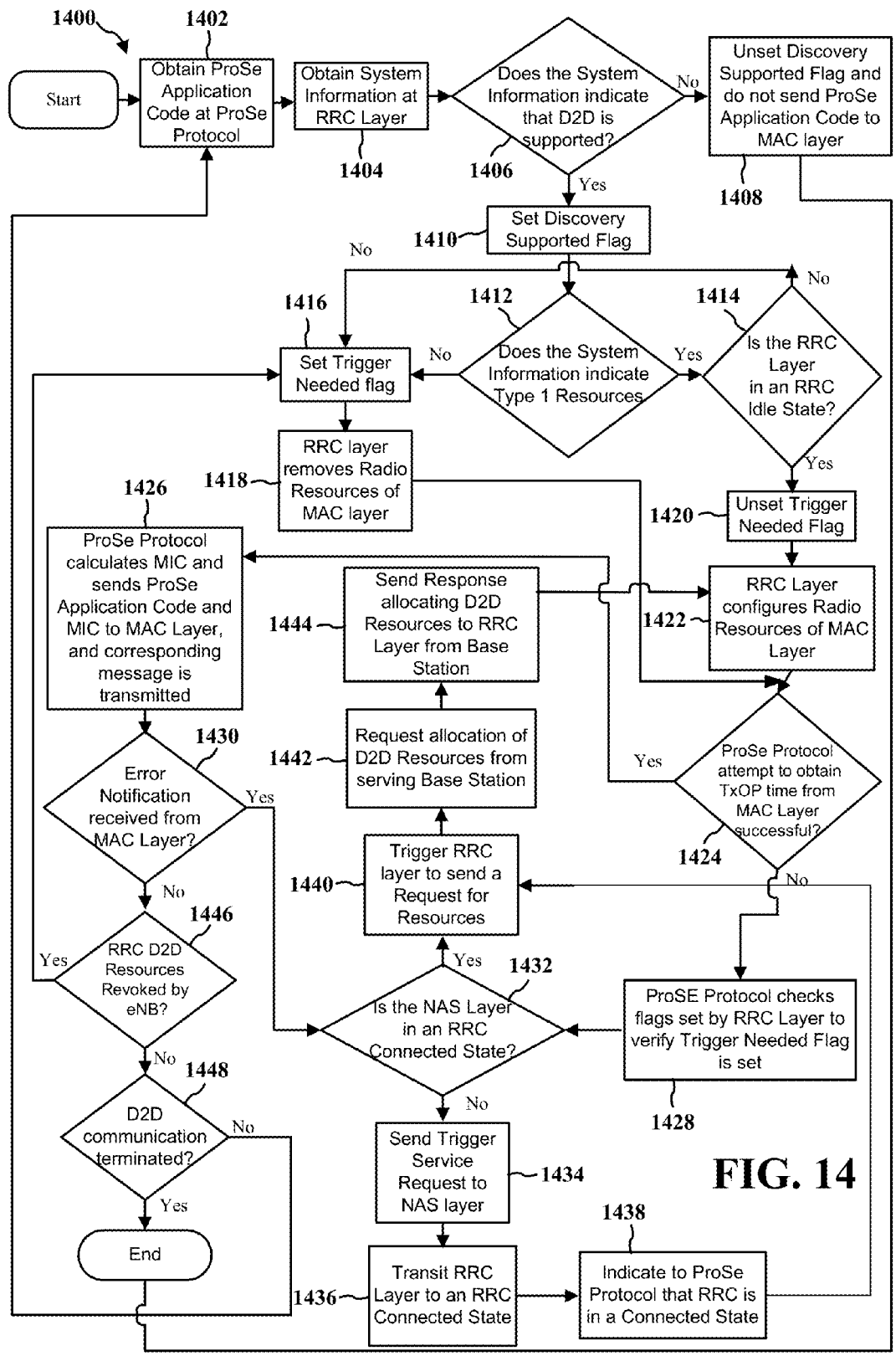
FIG. 14 is a flow chart of a method of wireless communication.

FIG. 14 is a flow chart 1400 of a method of wireless communication. The method may be performed by a UE (e.g., the UE 802).

At step 1402, a ProSe Protocol (e.g., the ProSe Protocol 804) obtains a ProSe Application Code. At step 1404, an RRC layer (e.g., the RRC layer 808) obtains system information (e.g., the SIB). At step 1406, the RRC layer determines whether the system information indicates that the network (e.g., the network of eNB 812) supports peer discovery (e.g., whether the network is an LTE-D network). If the system information indicates that the network does not support D2D communication, then the RRC layer unsets a flag (e.g., a second flag, or the Discovery Supported flag), such that a value corresponding thereto is 0, at step 1408. Accordingly, the ProSe Protocol should not attempt D2D communication, and the process is ended.

If the system information indicates that the network does support peer discovery, or does support D2D communication, then the RRC layer sets the flag (e.g., the Discovery Supported flag, or the D2D Communication Supported flag), such that a value corresponding thereto is 1, at step 1410. At step 1412, the RRC layer determines whether the system information indicates Type 1 Resources, and at step 1414, the RRC layer determines whether the UE is in an idle state. If the RRC layer determines at steps 1412 and 1414 either that the system information fails to indicate Type 1 resources, or that the UE is not in the idle state (e.g., the UE is in a connected state), then the RRC layer sets another flag (e.g., a first flag, or the Trigger Needed flag) at step 1416, and then removes the D2D Radio Resources of a MAC layer (e.g., the MAC layer 810) at step 1418.

However, if RRC layer determines that the system information does indicate Type 1 resources, and that the UE is in the idle state, the RRC layer will unset the other flag (e.g., set the Trigger Needed flag to 0) at step 1420, and will configure the D2D Radio Resources of the MAC layer at step 1422.

After the RRC layer either configures the D2D Radio Resources of the MAC layer at step 1422, or removes the D2D Radio Resources of the MAC layer at step 1418, the ProSe Protocol will attempt to obtain a TxOP time from the MAC layer at step 1424. It should be noted that multiple ProSe Application Codes may be obtained within the framework of FIG. 14, in which case, multiple corresponding MICs will be calculated, and multiple TxOP times may be obtained from the MAC layer, as discussed above.

If the ProSe Protocol's attempt is successful, at step 1426, the ProSe Protocol calculates a Message Integrity Checksum (MIC) for the ProSe Application Code, which was obtained at step 1402, and sends the MIC and the ProSe Application Code to the MAC layer.

However, if the ProSe Protocol's attempt to obtain the TxOP time from the MAC layer at step 1424 is unsuccessful, then at step 1428, the ProSe Protocol checks the flags set by the RRC layer (e.g., to verify that the Trigger Needed flag is set and/or to verify the Discovery Supported flag is set).

If, after sending the MIC and the ProSe Application Code to the MAC layer at step 1426, an error notification is received by the ProSe Protocol from the MAC layer at step 1430, or after verifying that the Trigger Needed flag is set at 1428, the ProSe Protocol checks with the NAS layer to determine whether the UE is in the connected state at step 1432.

If the UE is determined to not be in a connected state at step 1432, then at step 1434, the ProSe Protocol sends a service request to trigger the NAS layer to switch to a connected state. Then, at step 1436, the UE is transitioned to a connected state. Then at step 1438, the NAS layer indicates to the ProSe Protocol that the RRC is in a connected state.

After step 1438, or alternatively, if the UE is determined to be in a connected state at step 1432, the ProSe Protocol layer instructs the RRC layer to send a request for resources to a serving base station (e.g., the eNB 812) at step 1440. At step 1442, the RRC layer requests allocation of resources from the serving base station. At step 1444, the serving base station sends a response to the RRC layer allocating D2D resources, such as peer discovery resources or D2D communication resources. Thereafter, the RRC layer returns to step 1422, and configures the Radio Resources of the MAC layer.

However, if no error notification is received by the ProSe Protocol from the MAC layer at step 1430, if the radio resources are not revoked by the eNB at step 1446, and if the D2D communication has not been terminated at step 1448, then the UE may return to step 1402 to obtain additional ProSe Application Codes for further transmissions.

Alternatively, if the resources are revoked, the RRC layer returns to step 1416 to set the Trigger Needed flag. If the D2D communication is terminated at step 1448, then the process ends.

Figure 15:
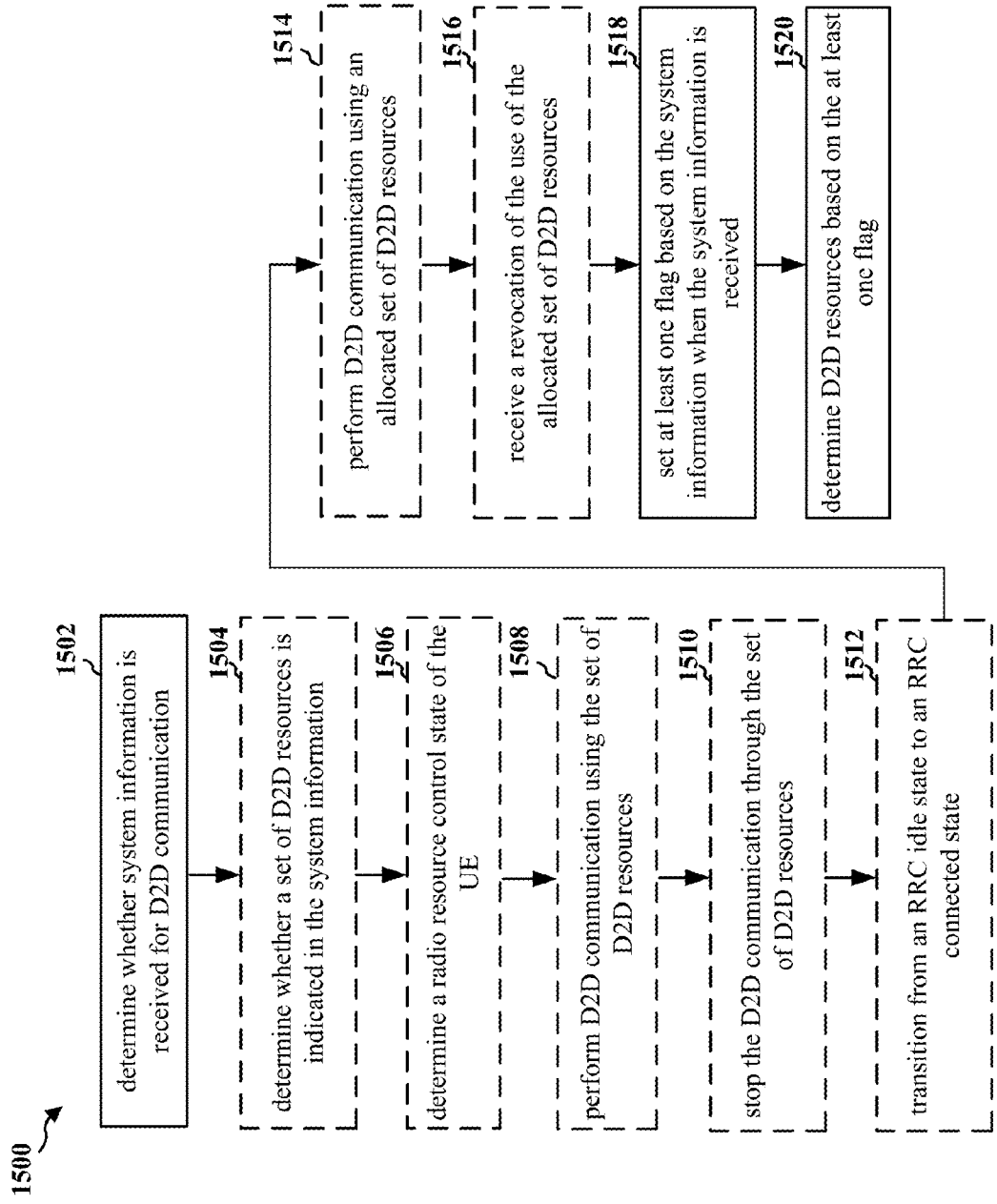
FIG. 15 is a diagram illustrating a first method of wireless communication.

FIG. 15 is a diagram 1500 illustrating a first method of wireless communication. The method may be performed by a UE, such as the UE 802. At 1502, the UE determines whether system information is received for D2D communication. A first layer of the UE may receive the system information and set the at least one flag, and a second layer that is higher than the first layer may check the at least one flag and request the first layer to determine the D2D resources (e.g., peer discovery resources).

At 1504, in one configuration, when the system information is determined to have been received for D2D communication, the UE may determine whether a set of D2D resources (e.g., common peer discovery resources) is indicated in the system information. At 1506, the UE may determine a radio resource control (RRC) state of the UE.

At 1508, in one configuration, when the system information is determined to have been received for D2D communication, and when a set of D2D resources, such as a set of common peer discovery resources, is indicated in the system information, the UE may perform D2D communication, such as D2D peer discovery communication, using the set of D2D resources. At 1510 the UE may stop the D2D communication through the set of D2D resources. At 1512, the UE may transition from an RRC idle state to an RRC connected state.

At 1514, in one configuration, when the system information is determined to have been received for D2D communication, and when a set of D2D resources, such as a set of common peer discovery resources, is not indicated in the system information, the UE may perform D2D communication, such as D2D peer discovery communication, using an allocated set of resources. At 1516, the UE may receive a revocation of the use of the allocated set of resources.

At 1518, the UE sets at least one flag based on the system information when the system information is received. The at least one flag may be set based on whether the set of the D2D resources is indicated in the system information, and based on the determined RRC state. When the set of D2D resources is determined to be indicated in the system information, and when the RRC state is determined to be an RRC idle state, and the setting the at least one flag may include setting a first flag of the at least one flag to indicate for the second layer that a request for an allocation of the D2D resources is unrequired. When the set of D2D resources is determined to be indicated in the system information, and when the RRC state is determined to be an RRC connected state, the setting the at least one flag may include setting a first flag of the at least one flag to indicate that a request for an allocation of the D2D is required. When the set of D2D resources is determined to be not indicated in the system information, and when the RRC state is determined to be an RRC idle state, the setting the at least one flag may include setting a first flag of the at least one flag to indicate for the second layer that a request for an allocation of the D2D resources is required. When the set of D2D resources is determined to be not indicated in the system information, and when the RRC state is determined to be an RRC connected state, the setting the at least one flag may include setting a first flag of the at least one flag to indicate for the second layer that a request for an allocation of the D2D resources is required. The at least one flag may be set upon transitioning from the RRC idle state to the RRC connected state. The setting the at least one flag may include setting a first flag of the at least one flag to indicate that a request for the allocation of the D2D resources is required. When the system information is determined not to have been received for D2D communication, and when setting the at least one flag includes setting a flag of the at least one flag indicating that D2D communication is unsupported, the D2D resources may be determined to be a null set. At 1520, the UE determines D2D resources based on the at least one flag.

In one configuration, the first layer is an RRC layer, and the second layer is a ProSe protocol layer. For cases 1a, 1b, 2a, 2b, in one configuration, the system information is determined to have been received for D2D communication (1502), and the UE determines whether a set of D2D resources, such as a set of common peer discovery resources, is indicated in the system information (1504), and determines an RRC state of the UE (1506). In such a configuration, the at least one flag is set based on whether the set of the D2D resources is indicated in the system information, and based on the determined RRC state (1518).

In one configuration, for case 1a, the set of D2D resources (e.g., common peer discovery resources) is determined to be indicated in the system information (1504), and the RRC state is determined to be an RRC idle state (1506). In addition, the first layer sets the at least one flag by setting a first flag of the at least one flag to indicate for the second layer that a request for an allocation of the D2D resources is unrequired (1518). In one configuration, the first layer sets the at least one flag by setting a second flag of the at least one flag to indicate that D2D communication is supported (1518). In one configuration, the UE determines from the at least one flag that D2D communication is supported, and that a request for an allocation of the D2D resources is unrequired. In such a configuration, the UE determines the D2D resources by determining to use the set of D2D resources indicated in the system information for D2D communication (1520).

In one configuration, for case 1b, the set of D2D resources (e.g., common peer discovery resources) is determined to be indicated in the system information (1504), and the RRC state is determined to be an RRC connected state (1506). In such a configuration, the first layer sets the at least one flag by setting a first flag of the at least one flag to indicate that a request for an allocation of the D2D resources is required (1518). In one configuration, the first layer sets the at least one flag by setting a second flag of the at least one flag to indicate that D2D communication is supported (1518). In one configuration, the UE determines from the at least one flag that D2D communication is supported, and that a request for an allocation of the D2D resources is required. In such a configuration, the UE determines the D2D resources by requesting, at the second layer, the first layer to request an allocation of the D2D resources from a serving base station; and by receiving the allocation of the D2D2 resources from the serving base station (1520). In such a configuration, the determined D2D resources are the received allocated D2D2 resources. In one configuration, the UE determines from the at least one flag that D2D communication is supported, and that a request for an allocation of the D2D resources is required. In such a configuration, the UE determines the D2D resources by requesting, at the second layer, the first layer to request performing D2D communication with a set of D2D resources from a serving base station; and by receiving a confirmation from the base station that the set of D2D resources is reserved for D2D communication (e.g., peer discovery) (1520).

In one configuration, in case 2a, the set of D2D resources (e.g., common peer discovery resources) is determined to be not indicated in the system information (1504), and the RRC state is determined to be an RRC idle state (1506). In such a configuration, the first layer sets the at least one flag by setting a first flag of the at least one flag to indicate for the second layer that a request for an allocation of the D2D resources is required (1518). In one configuration, the first layer sets the at least one flag by setting a second flag of the at least one flag to indicate that D2D communication is supported (1518). In one configuration, the UE determines from the at least one flag that D2D communication is supported, and that a request for an allocation of the D2D resources is required. In such a configuration, the UE determines the D2D resources by transitioning from the RRC idle state to an RRC connected state by requesting, at the second layer, the first layer to request an allocation of the D2D resources from a serving base station, and by receiving the allocation of the D2D resources from the serving base station (1520). In such a configuration, the determined D2D resources are the received allocated D2D resources. In one configuration, the UE controls, by the second layer, a third layer that is higher than the first layer to cause the first layer to transition from the RRC idle state to the RRC connected state. In one configuration, the third layer is a NAS layer.

In one configuration, in case 2b, the set of D2D resources (e.g., common peer discovery resources) is determined to be not indicated in the system information (1504), and the RRC state is determined to be an RRC connected state (1506). In such a configuration, the first layer sets the at least one flag by setting a first flag of the at least one flag to indicate for the second layer that a request for an allocation of the D2D resources is required (1518). In one configuration, the first layer sets the at least one flag by setting a second flag of the at least one flag to indicate that D2D communication is supported (1518). In one configuration, the UE determines from the at least one flag that D2D communication is supported, and that a request for an allocation of the D2D resources is required. In such a configuration, the UE determines the D2D resources by requesting, at the second layer, the first layer to request an allocation of the D2D resources from a serving base station, and by receiving the allocation of the D2D resources from the serving base station, wherein the determined D2D resources are the received allocated D2D resources (1520). In one configuration, the UE determines from the at least one flag that D2D communication is supported, and that a request for an allocation of the D2D resources is required. In such a configuration, the UE determines the D2D resources by requesting, at the second layer, the first layer to request performing D2D communication with a set of D2D resources from a serving base station, and by receiving a confirmation from the base station that the set of D2D resources is reserved for D2D communication (e.g., peer discovery) (1520).

In one configuration, in case 1 c, the system information is determined to have been received for D2D communication (1502), and the set of D2D resources (e.g., common peer discovery resources) is indicated in the system information (1504). In such a configuration, the UE performs D2D communication using the set of D2D resources (1508), stops the D2D communication through the set of D2D resources (1510), and transitions from an RRC idle state to an RRC connected state (1512). In addition, in such a configuration, the at least one flag is set upon transitioning from the RRC idle state to the RRC connected state, and the first layer sets the at least one flag by setting a first flag of the at least one flag to indicate that a request for the allocation of the D2D resources is required (1518). In one configuration, the first layer sets the at least one flag by setting a second flag of the at least one flag to indicate that D2D communication is supported (1518). In one configuration, the UE determines from the at least one flag that D2D communication is supported, and that a request for an allocation of the D2D resources is required. In such a configuration, the UE determines the D2D resources by determining, at the second layer, that no D2D resources are available; by requesting, at the second layer, the first layer to request an allocation of the D2D resources from a serving base station, and by receiving the allocation of the D2D resources from the serving base station (1520). In such a configuration, the determined D2D resources are the received allocated D2D resources.

In one configuration, in case 2c, the system information is determined to have been received for D2D communication (1502), and the set of D2D resources is not indicated in the system information (1504). In such a configuration, the UE performs D2D communication using an allocated set of D2D resources (e.g., an allocated set of peer discovery resources) (1514), and receives a revocation of the use of the allocated set of D2D resources (1516). In such a configuration, the first layer sets the at least one flag by setting a first flag of the at least one flag to indicate that a request for the allocation of the D2D resources is required (1518). In one configuration, the first layer sets the at least one flag by setting a second flag of the at least one flag to indicate that D2D communication is supported (1518). In one configuration, the UE determines from the at least one flag that D2D communication is supported, and that a request for an allocation of the D2D resources is required. In such a configuration, the UE determines the D2D resources by determining, at the second layer, that no D2D resources are available; by requesting, at the second layer, the first layer to request an allocation of the D2D resources from a serving base station, and by receiving the allocation of the D2D resources from the serving base station, wherein the determined D2D resources are the received allocated D2D resources (1520).

In one configuration, in case 3, the system information is determined not to have been received for D2D communication (1502), and the first layer sets the at least one flag by setting a flag of the at least one flag indicating that D2D communication is unsupported, wherein the D2D resources are determined to be a null set (1518). In one configuration, the UE transmits signals in the D2D resources (e.g., peer discovery resources).

Figure 16:
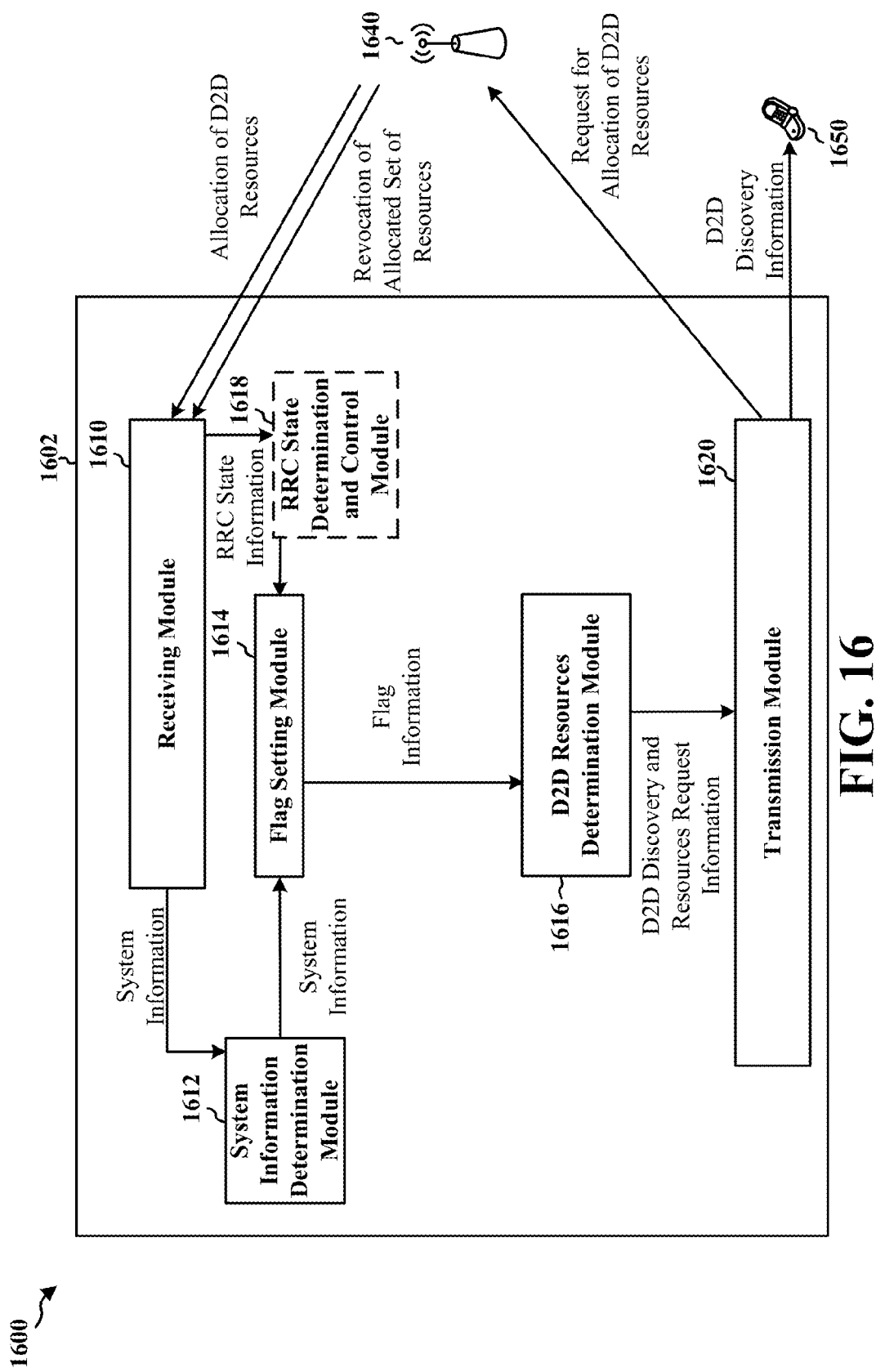
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 1602. The apparatus 1602 may be a UE. The apparatus 1602 includes a receiving module 1610 that is configured to receive system information for D2D communication. The apparatus 1602 further includes a system information determination module 1612 that is configured to determine whether system information is received for D2D communication. The apparatus 1602 further includes a flag setting module 1614 that is configured to set at least one flag based on the system information when the system information is received (e.g., information corresponding to peer discovery resources allocated by a base station 1640). The apparatus 1602 further includes a D2D resources determination module (e.g., a peer discovery resources determination module) 1616 that is configured to determine D2D resources based on the at least one flag. In one configuration, a first layer of the apparatus 1602 comprises the receiving module 1610, the flag setting module 1614, and the D2D resources determination module 1616, and a second layer of the apparatus 1602 that is higher than the first layer is configured to check the at least one flag and to request the first layer to determine the D2D resources. In one configuration, the apparatus 1602 further includes an RRC state determination and control module 1618 that is configured to determine an RRC state of the apparatus 1602, while the system information determination module 1612 is configured to determine whether a set of D2D resources is indicated in the system information, and while the flag setting module 1614 is configured to set the at least one flag based on whether the set of the D2D resources is indicated in the system information, and based on the determined RRC state. In one configuration, when the set of D2D resources is determined to be indicated in the system information, and when the RRC state is determined to be an RRC idle state, the flag setting module 1614 is configured to set a first flag of the at least one flag to indicate for the second layer that a request for an allocation of the D2D resources is unrequired. In one configuration, when the set of D2D resources is determined to be indicated in the system information, and when the RRC state is determined to be an RRC connected state, the flag setting module 1614 is configured to set a first flag of the at least one flag to indicate that a request for an allocation of the D2D resources is required. In one configuration, when the set of D2D resources is determined to be not indicated in the system information, and when the RRC state is determined to be an RRC idle state, the flag setting module 1614 is configured to set a first flag of the at least one flag to indicate for the second layer that a request for an allocation of the D2D resources is required. In one configuration, when the set of D2D resources is determined to be not indicated in the system information, and when the RRC state is determined to be an RRC connected state, the flag setting module 1614 is configured to set a first flag of the at least one flag to indicate for the second layer that a request for an allocation of the D2D resources is required. In one configuration, the apparatus 1602 further includes a transmission module 1620, and when the system information is determined to have been received for D2D communication, and when a set of D2D resources is indicated in the system information, the transmission module 1620 is configured to perform D2D communication (e.g., with another UE 1650) using the set of D2D resources, and is configured to stop the D2D communication through the set of D2D resources, while the RRC state determination and control module 1618 is configured to transition the apparatus 1602 from an RRC idle state to an RRC connected state, and while the flag setting module 1614 is configured to set the at least one flag upon the apparatus 1602 transitioning from the RRC idle state to the RRC connected state, and is configured to set a first flag of the at least one flag to indicate that a request for the allocation of the D2D resources is required. In one configuration, when the system information is determined to have been received for D2D communication, and when a set of D2D resources is not indicated in the system information, the transmission module 1620 is configured to perform D2D communication, such as D2D peer discovery communication, using an allocated set of D2D resources, and the receiving module 1610 is configured to receive a revocation of the use of the allocated set of D2D resources, and the flag setting module 1614 is configured to set a first flag of the at least one flag to indicate that a request for the allocation of the D2D resources is required.

Figure 17:
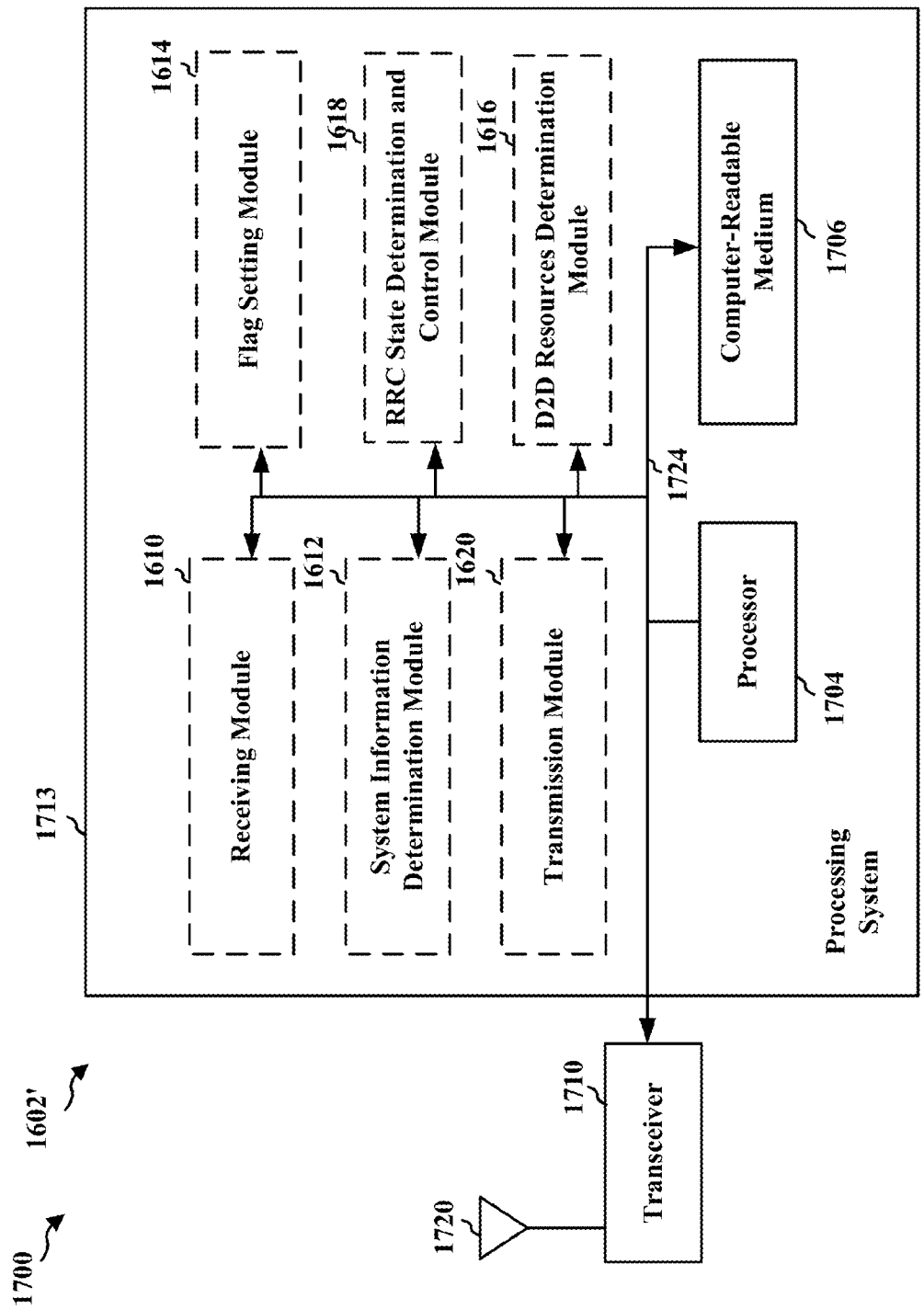
FIG. 17 is a diagram illustrating an example of a hardware implementation for an apparatus employing a processing system.

FIG. 17 is a diagram 1700 illustrating an example of a hardware implementation for an apparatus 1602' employing a processing system 1713. The processing system 1713 may be implemented with a bus architecture, represented generally by the bus 1724. The bus 1724 may include any number of interconnecting buses and bridges depending on the specific application of the processing system 1713 and the overall design constraints. The bus 1724 links together various circuits including one or more processors and/or hardware modules, represented by the processor 1704, the modules 1610, 1612, 1614, and the computer-readable medium/memory 1706. The bus 1724 may also link various other circuits such as timing sources, peripherals, voltage regulators, and power management circuits, which are well known in the art, and therefore, will not be described any further.

The processing system 1713 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1713. In addition, the transceiver 1710 receives information from the processing system 1713, and based on the received information, generates a signal to be applied to the one or more antennas 1720. The processing system 1713 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1713 to perform the various functions described supra for any particular apparatus. The computer-readable medium/memory 1706 may also be used for storing data that is manipulated by the processor 1704 when executing software. The processing system further includes at least one of the modules 1610, 1612, 1614. The modules may be software modules running in the processor 1704, resident/stored in the computer readable medium/memory 1706, one or more hardware modules coupled to the processor 1704, or some combination thereof. The processing system 1713 may be a component of the eNB 610 and may include the memory 676 and/or at least one of the TX processor 616, the RX processor 670, and the controller/processor 675.

In one configuration, the apparatus 1602/1602' for wireless communication may be a UE. The UE includes means for determining whether system information is received for device-to-device (D2D) communication, means for setting at least one flag based on the system information when the system information is received, and means for determining D2D resources based on the at least one flag.

The UE may further include means for determining whether a set of D2D resources is indicated in the system information, and means for determining a radio resource control (RRC) state of the UE. The at least one flag may be set based on whether the set of the D2D resources is indicated in the system information, and based on the determined RRC state. The means for setting the at least one flag may be configured to set a first flag of the at least one flag to indicate for the second layer that a request for an allocation of the D2D resources is either required, or unrequired, depending on whether the set of D2D resources is determined to be indicated in the system information, and on the determination of the RRC state.

The UE may further include means for performing D2D communication using a set of D2D resources, means for stopping the D2D communication through the set of D2D resources, and means for transitioning from an RRC idle state to an RRC connected state. When the system information is determined to have been received for D2D communication, and when the set of D2D resources is indicated in the system information, the at least one flag is set upon transitioning from the RRC idle state to the RRC connected state, and the means for setting the at least one flag is configured to set a first flag of the at least one flag to indicate that a request for the allocation of the D2D resources is required.

The UE may further include means for performing D2D communication using an allocated set of D2D resources, and means for receiving a revocation of the use of the allocated set of D2D resources. When the system information is determined to have been received for D2D communication, and when the set of D2D resources is not indicated in the system information, the means for setting the at least one flag is configured to set a first flag of the at least one flag to indicate that a request for the allocation of the D2D resources is required.

The aforementioned means may be one or more of the aforementioned modules of the apparatus 1602 and/or the processing system 1713 of the apparatus 1602' configured to perform the functions recited by the aforementioned means. As described supra, the processing system 1713 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
    determining whether system information is received for device-to-device (D2D) communication;
    setting at least one flag based on the system information when the system information is received, wherein a first layer of the UE receives the system information and sets the at least one flag to indicate, to a second layer that is higher than the first layer, whether a request for an allocation of D2D resources is required;
    determining the D2D resources based on the at least one flag, wherein the second layer that is higher than the first layer checks the at least one flag to determine whether an action is required by the second layer to enable the first layer to determine the D2D resources; and
    sending, by the second layer, a message including a message integrity checksum based on a transmission opportunity time.

2. The method of claim 1, wherein the system information is determined to have been received for D2D communication, the method further comprising:
    determining whether a set of common D2D resources is indicated in the system information; and
    determining a radio resource control (RRC) state of the UE, wherein the at least one flag is set based on whether the set of the common D2D resources is indicated in the system information, and based on the determined RRC state.

3. The method of claim 2, wherein the set of common D2D resources is determined to be indicated in the system information, and the RRC state is determined to be an RRC idle state, and
wherein the setting the at least one flag comprises setting a first flag of the at least one flag to indicate to the second layer that the request for an allocation of the D2D resources is unrequired.

4. The method of claim 2, wherein the set of common D2D resources is determined to be indicated in the system information, and the RRC state is determined to be an RRC connected state, and
wherein the setting the at least one flag comprises setting a first flag of the at least one flag to indicate that the request for an allocation of the D2D resources is required.

5. The method of claim 2, wherein the set of common D2D resources is determined to be not indicated in the system information, and the RRC state is determined to be an RRC idle state, and
wherein the setting the at least one flag comprises setting a first flag of the at least one flag to indicate to the second layer that the request for an allocation of the D2D resources is required.

6. The method of claim 2, wherein the set of common D2D resources is determined to be not indicated in the system information, and the RRC state is determined to be an RRC connected state, and
wherein the setting the at least one flag comprises setting a first flag of the at least one flag to indicate to the second layer that the request for an allocation of the D2D resources is required.

7. The method of claim 1, wherein the system information is determined to have been received for D2D communication, and wherein a set of common D2D resources is indicated in the system information, the method further comprising:
performing D2D communication using the set of common D2D resources;
stopping the D2D communication through the set of common D2D resources; and
transitioning from an RRC idle state to an RRC connected state;
wherein the at least one flag is set upon transitioning from the RRC idle state to the RRC connected state, and
wherein the setting the at least one flag comprises setting a first flag of the at least one flag to indicate that the request for the allocation of the D2D resources is required.

8. The method of claim 1, wherein the system information is determined to have been received for D2D communication, and wherein a set of common D2D resources is not indicated in the system information, the method further comprising:
performing D2D communication using an allocated set of D2D resources; and
receiving a revocation of the use of the allocated set of D2D resources,
wherein the setting the at least one flag comprises setting a first flag of the at least one flag to indicate that the request for the allocation of the D2D resources is required.

9. The method of claim 1, wherein the first layer is a radio resource control (RRC) layer, and the second layer is a proximity-based service (ProSe) protocol layer.

10. An apparatus for wireless communication, the apparatus being a UE, comprising:
means for determining whether system information is received for device-to-device (D2D) communication;
means for setting at least one flag based on the system information when the system information is received, wherein the apparatus is a user equipment (UE) and a first layer of the UE receives the system information and sets the at least one flag to indicate, to a second layer that is higher than the first layer, whether a request for an allocation of D2D resources is required;
means for determining the D2D resources based on the at least one flag, wherein the second layer that is higher than the first layer checks the at least one flag to determine whether an action is required by the second layer to enable the first layer to determine the D2D resources; and
means for sending, by the second layer, a message including a message integrity checksum based on a transmission opportunity time.

11. The apparatus of claim 10, wherein the system information is determined to have been received for D2D communication, the apparatus further comprising:
means for determining whether a set of common D2D resources is indicated in the system information; and
means for determining a radio resource control (RRC) state of the UE,
wherein the at least one flag is set based on whether the set of the common D2D resources is indicated in the system information, and based on the determined RRC state.

12. The apparatus of claim 11, wherein the set of common D2D resources is determined to be indicated in the system information, and the RRC state is determined to be an RRC idle state, and
wherein the means for setting the at least one flag is configured to set a first flag of the at least one flag to indicate to the second layer that the request for an allocation of the D2D resources is unrequired.

13. The apparatus of claim 11, wherein the set of common D2D resources is determined to be indicated in the system information, and the RRC state is determined to be an RRC connected state, and
wherein the means for setting the at least one flag is configured to set a first flag of the at least one flag to indicate that the request for an allocation of the D2D resources is required.

14. The apparatus of claim 11, wherein the set of common D2D resources is determined to be not indicated in the system information, and the RRC state is determined to be an RRC idle state, and
wherein the means for setting the at least one flag is configured to set a first flag of the at least one flag to indicate to the second layer that the request for an allocation of the D2D resources is required.

15. The apparatus of claim 11, wherein the set of common D2D resources is determined to be not indicated in the system information, and the RRC state is determined to be an RRC connected state, and
wherein the means for setting the at least one flag is configured to set a first flag of the at least one flag to indicate to the second layer that the request for an allocation of the D2D resources is required.

16. The apparatus of claim 10, wherein the system information is determined to have been received for D2D communication, and wherein a set of common D2D resources is indicated in the system information, the apparatus further comprising:
means for performing D2D communication using the set of common D2D resources;
means for stopping the D2D communication through the set of common D2D resources; and
means for transitioning from an RRC idle state to an RRC connected state;
wherein the at least one flag is set upon transitioning from the RRC idle state to the RRC connected state, and
wherein the means for setting the at least one flag is configured to set a first flag of the at least one flag to indicate that the request for the allocation of the D2D resources is required.

17. The apparatus of claim 10, wherein the system information is determined to have been received for D2D communication, and wherein a set of common D2D resources is not indicated in the system information, the apparatus further comprising:
means for performing D2D communication using an allocated set of D2D resources; and
means for receiving a revocation of the use of the allocated set of D2D resources,
wherein the means for setting the at least one flag is configured to set a first flag of the at least one flag to indicate that the request for the allocation of the D2D resources is required.

18. The apparatus of claim 10, wherein the first layer is a radio resource control (RRC) layer, and the second layer is a proximity-based service (ProSe) protocol layer.

19. An apparatus for wireless communication, comprising:
a memory; and
at least one processor coupled to the memory and configured to:
determine whether system information is received for device-to-device (D2D) communication;
set at least one flag based on the system information when the system information is received;
determine D2D resources based on the at least one flag, wherein the apparatus is a user equipment (UE), wherein a first layer of the UE receives the system information and sets the at least one flag to indicate, to a second layer that is higher than the first layer, whether a request for an allocation of the D2D resources is required, and the second layer that is higher than the first layer checks the at least one flag to determine whether an action is required by the second layer to enable the first layer to determine the D2D resources; and
control the second layer to send a message including a message integrity checksum based on a transmission opportunity time.

20. The apparatus of claim 19, wherein the system information is determined to have been received for D2D communication, wherein the at least one processor is further configured to:
determine whether a set of common D2D resources is indicated in the system information; and
determine a radio resource control (RRC) state of the UE, wherein the at least one flag is set based on whether the set of the common D2D resources is indicated in the system information, and based on the determined RRC state.

21. The apparatus of claim 20, wherein the set of common D2D resources is determined to be indicated in the system information, and the RRC state is determined to be an RRC idle state, and
wherein the at least one processor is configured to set the at least one flag by setting a first flag of the at least one flag to indicate to the second layer that the request for an allocation of the D2D resources is unrequired.

22. The apparatus of claim 20, wherein the set of common D2D resources is determined to be indicated in the system information, and the RRC state is determined to be an RRC connected state, and
wherein the at least one processor is further configured to set a first flag of the at least one flag to indicate that the request for an allocation of the D2D resources is required.

23. The apparatus of claim 20, wherein the set of common D2D resources is determined to be not indicated in the system information, and the RRC state is determined to be an RRC idle state, and
wherein the at least one processor is further configured to set a first flag of the at least one flag to indicate to the second layer that the request for an allocation of the D2D resources is required.

24. The apparatus of claim 20, wherein the set of common D2D resources is determined to be not indicated in the system information, and the RRC state is determined to be an RRC connected state, and
wherein the at least one processor is configured to set a first flag of the at least one flag to indicate to the second layer that the request for an allocation of the D2D resources is required.

25. The apparatus of claim 19, wherein the system information is determined to have been received for D2D communication, and wherein a set of common D2D resources is indicated in the system information, wherein the at least one processor is further configured to:
perform D2D communication using the set of common D2D resources;
stop the D2D communication through the set of common D2D resources; and
transition from an RRC idle state to an RRC connected state;
wherein the at least one flag is set upon transitioning from the RRC idle state to the RRC connected state, and
wherein the at least one processor is configured to set a first flag of the at least one flag to indicate that the request for the allocation of the D2D resources is required.

26. The apparatus of claim 19, wherein the system information is determined to have been received for D2D communication, and wherein a set of common D2D resources is not indicated in the system information, wherein the at least one processor is further configured to:
perform D2D communication using an allocated set of D2D resources; and
receive a revocation of the use of the allocated set of D2D resources,
wherein the at least one processor is configured to set a first flag of the at least one flag to indicate that the request for the allocation of the D2D resources is required.

27. A non-transitory computer-readable medium of a user equipment (UE) comprising code that when executed on at least one processor causes the at least one processor to:
determine whether system information is received for device-to-device (D2D) communication;

set at least one flag based on the system information when the system information is received, wherein a first layer of the UE receives the system information and sets the at least one flag to indicate, to a second layer that is higher than the first layer, whether a request for an allocation of D2D resources is required;

determine D2D resources based on the at least one flag, wherein the second layer that is higher than the first layer checks the at least one flag to determine whether an action is required by the second layer to enable the first layer to determine the D2D resources; and control the second layer to send a message including a message integrity checksum based on a transmission opportunity time.

\* \* \* \* \*